May 18, 1965  M. E. GEE ETAL  3,183,640
CANTALOUPE PACKING MACHINE
Filed May 29, 1962  16 Sheets-Sheet 1
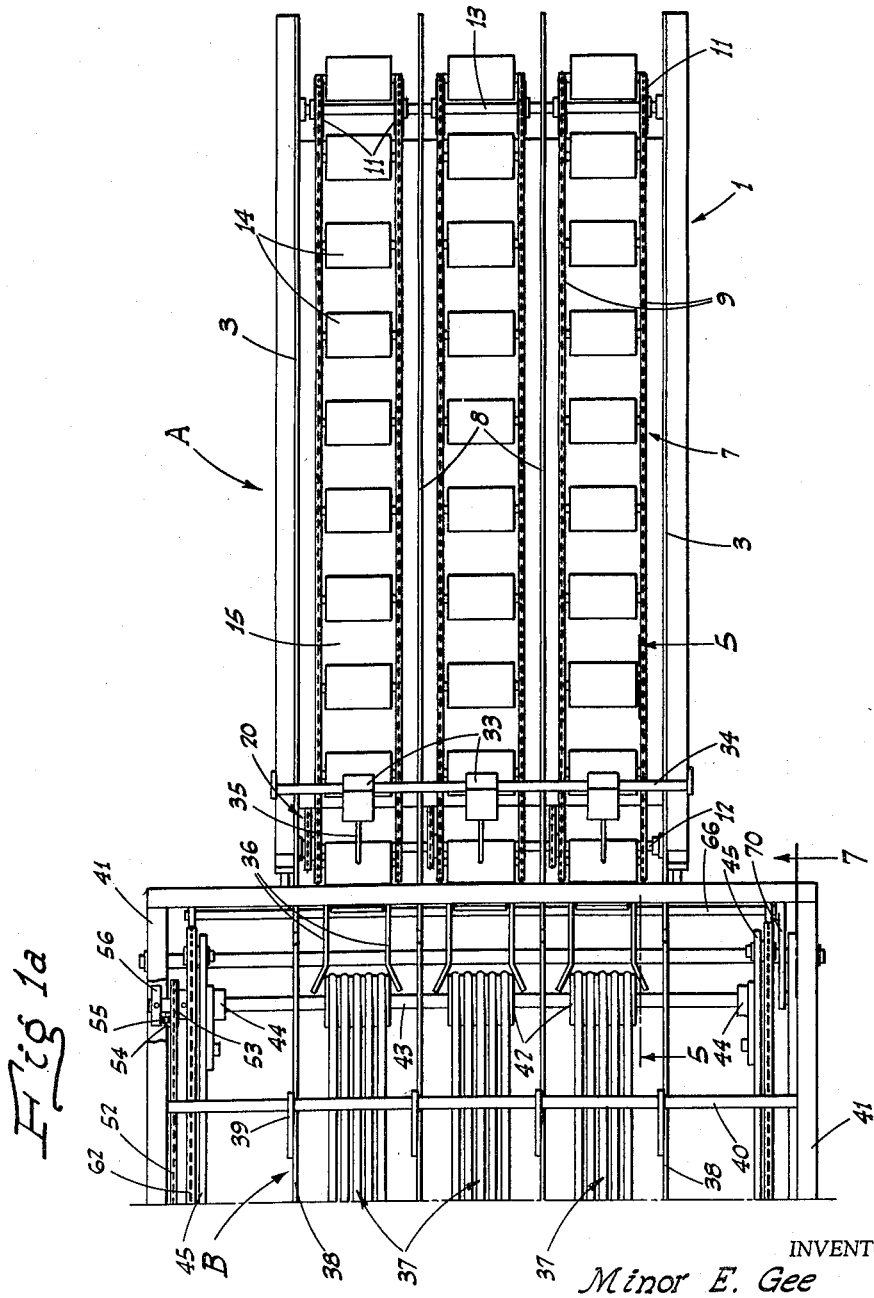
INVENTORS
Minor E. Gee
Charles L. Seagraves
BY Webster & Webster
ATTYS.

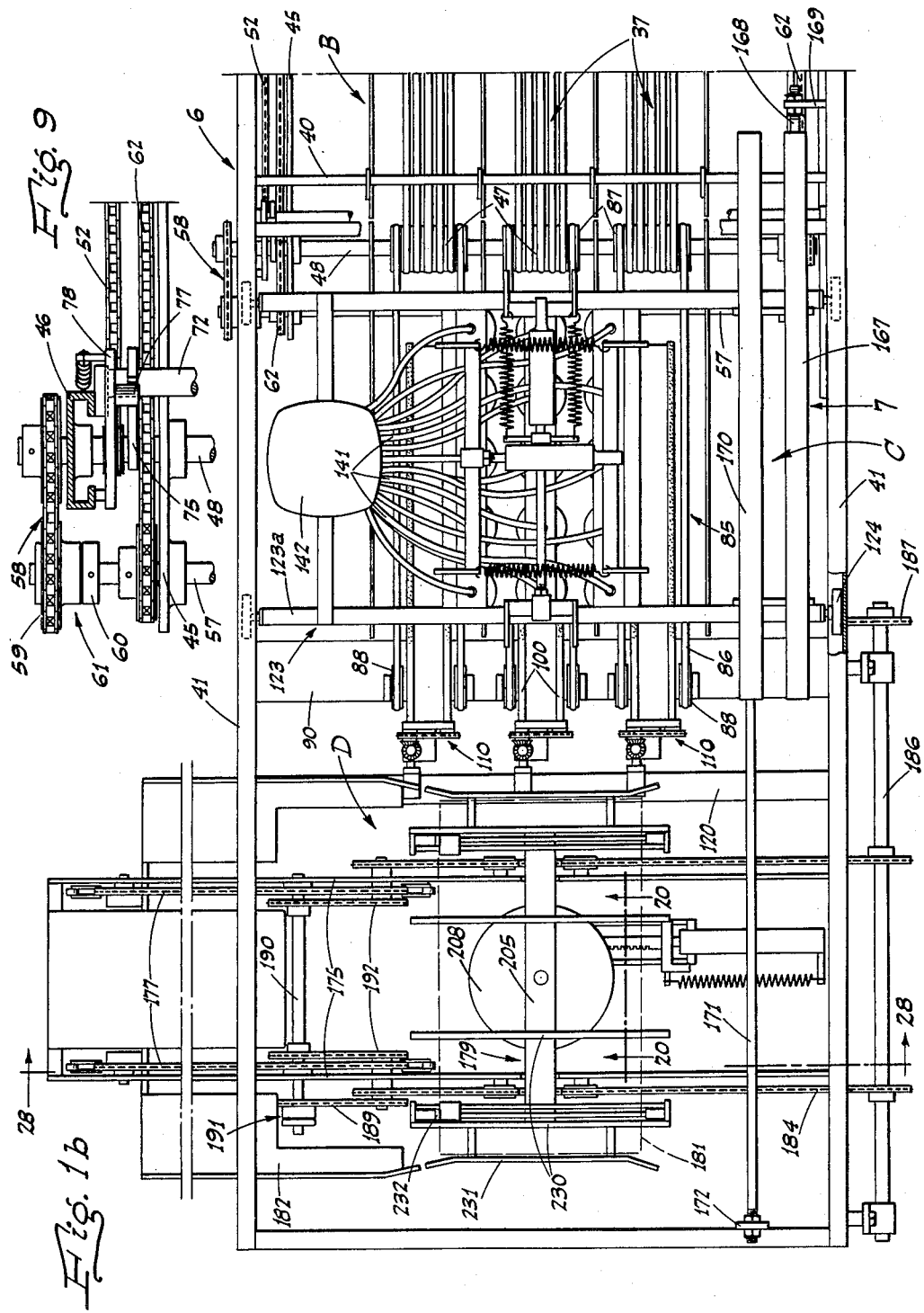

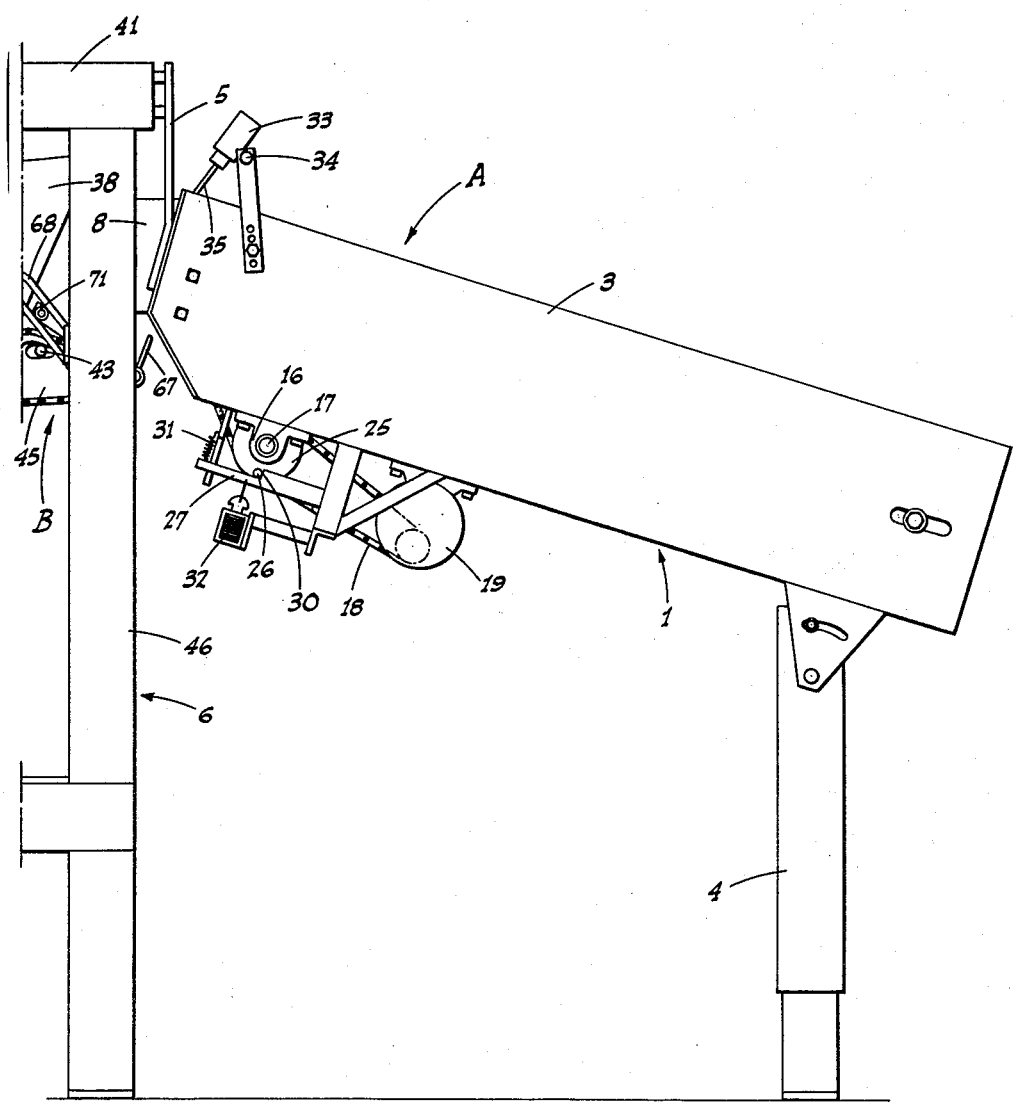

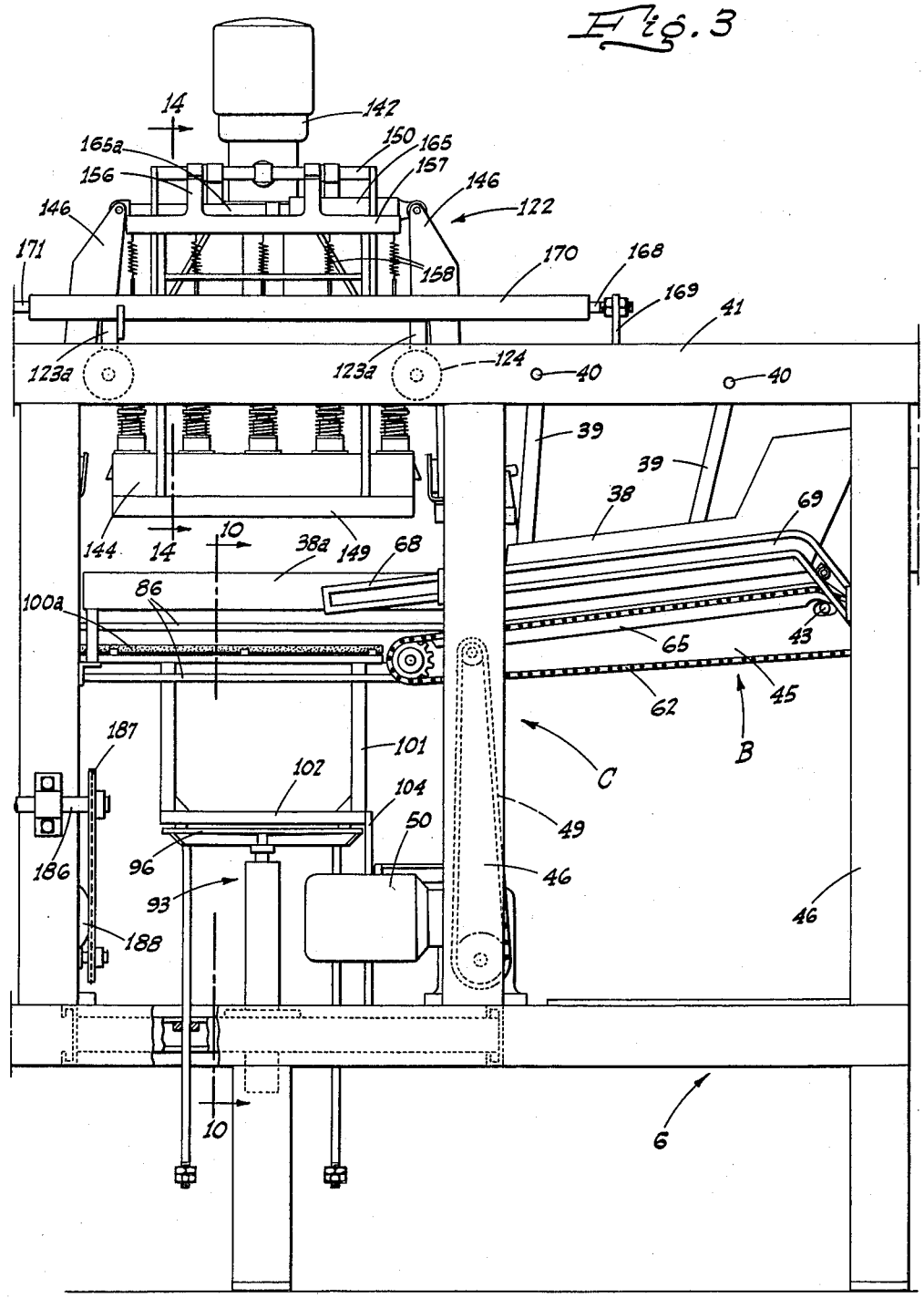

May 18, 1965 M. E. GEE ETAL 3,183,640
CANTALOUPE PACKING MACHINE
Filed May 29, 1962 16 Sheets-Sheet 5

May 18, 1965  M. E. GEE ETAL  3,183,640
CANTALOUPE PACKING MACHINE
Filed May 29, 1962  16 Sheets-Sheet 6

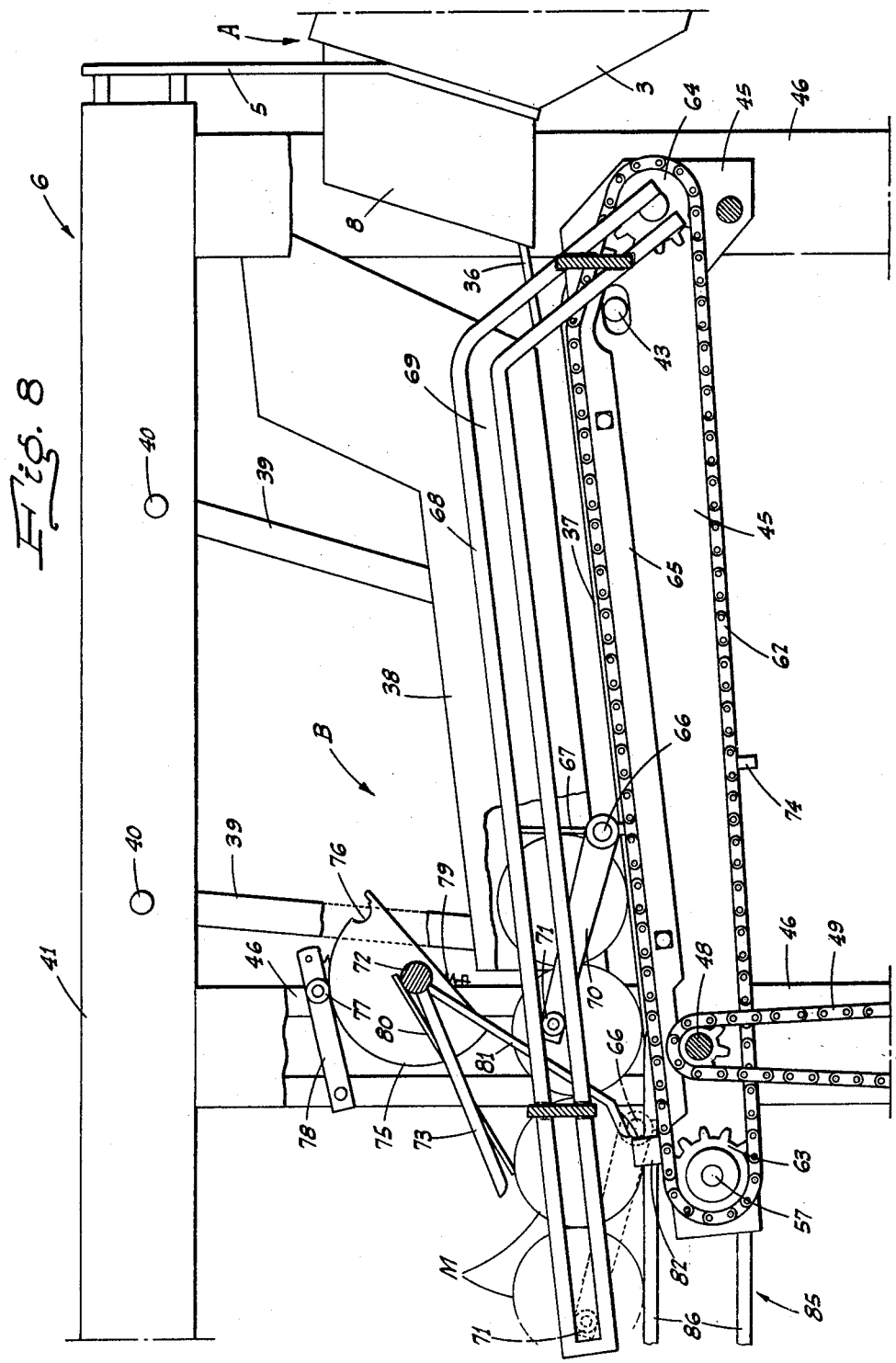

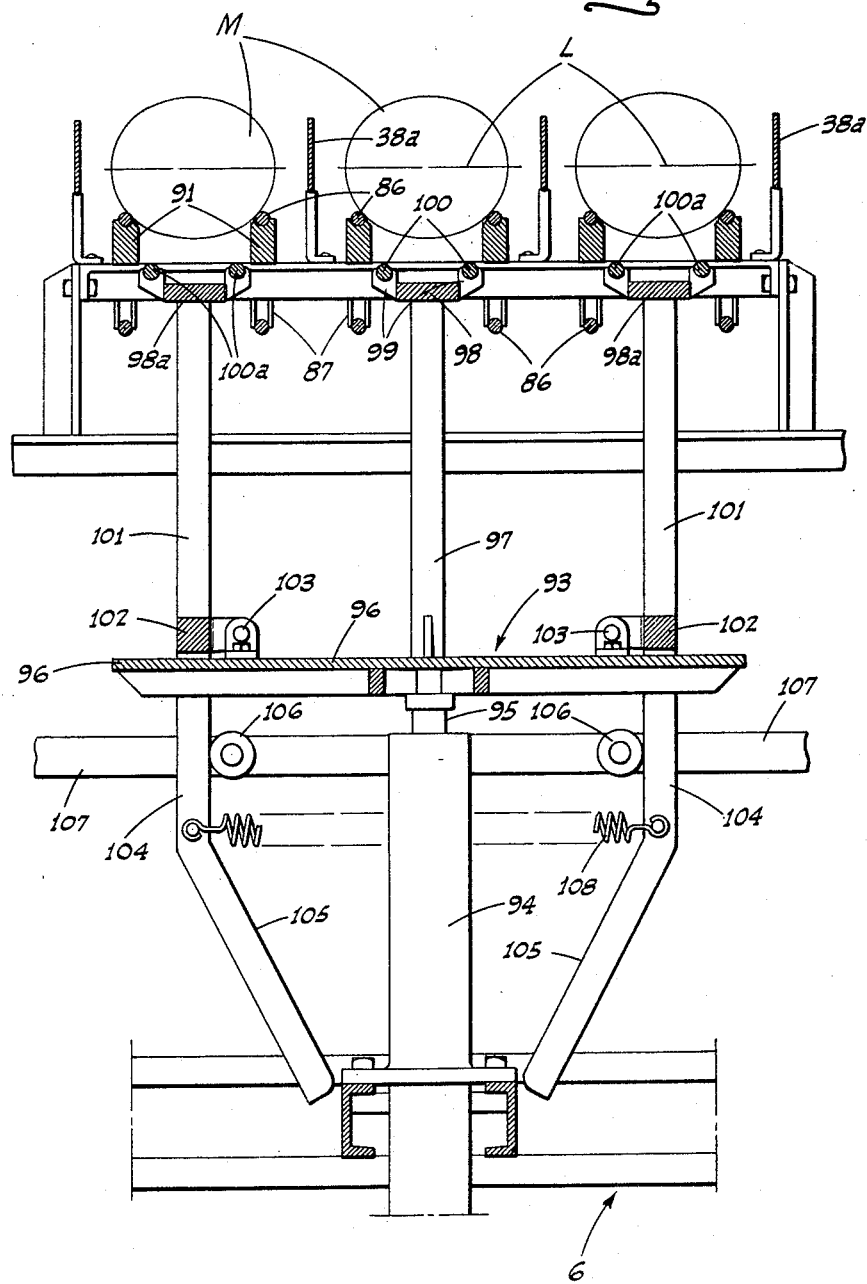

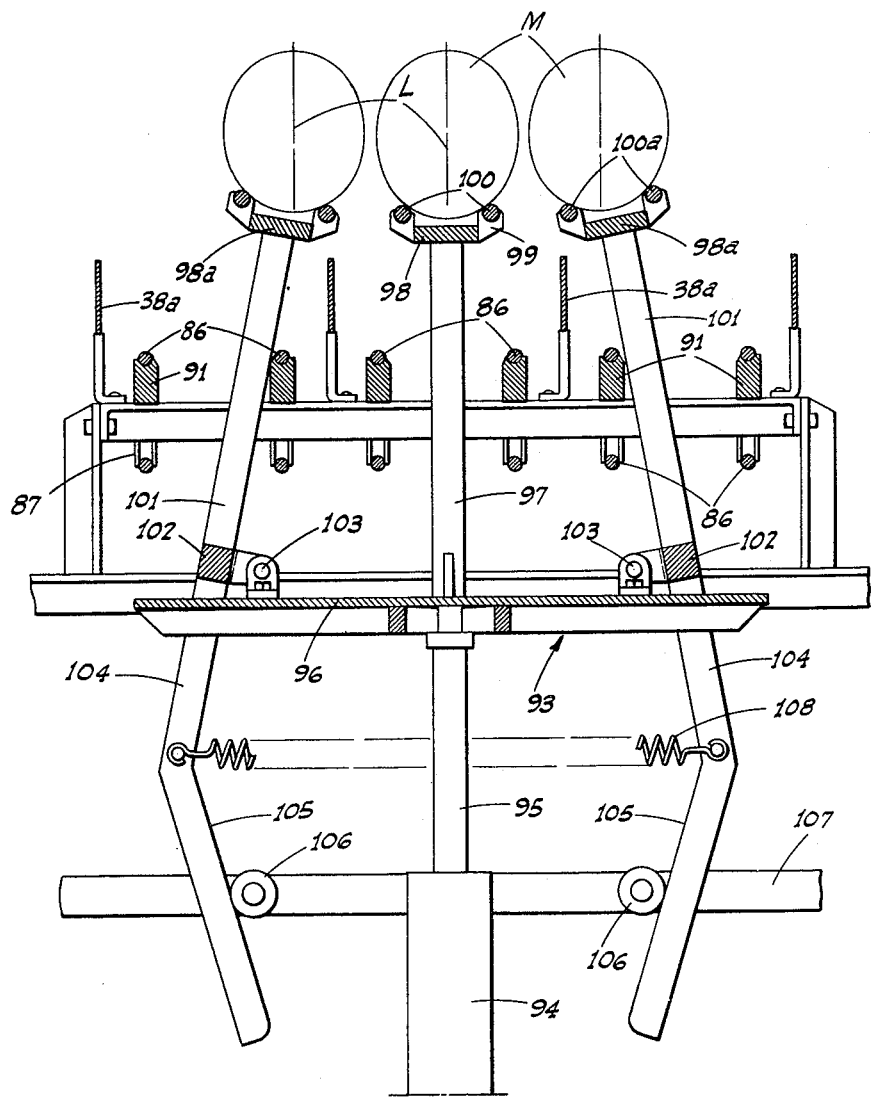

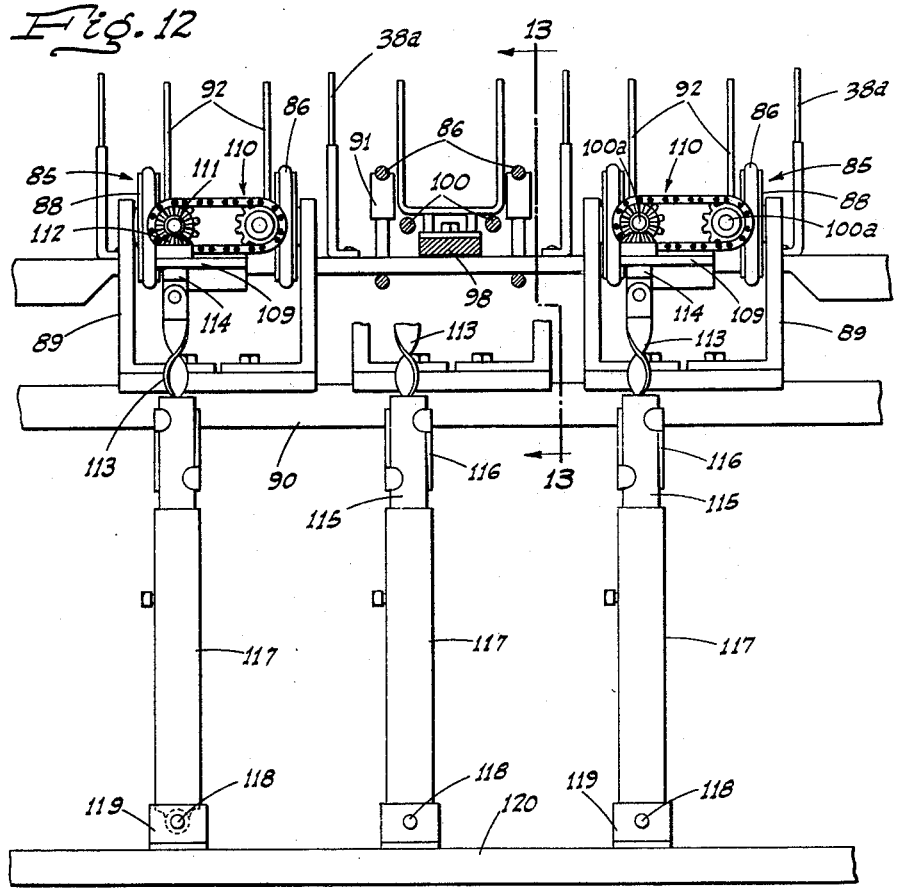
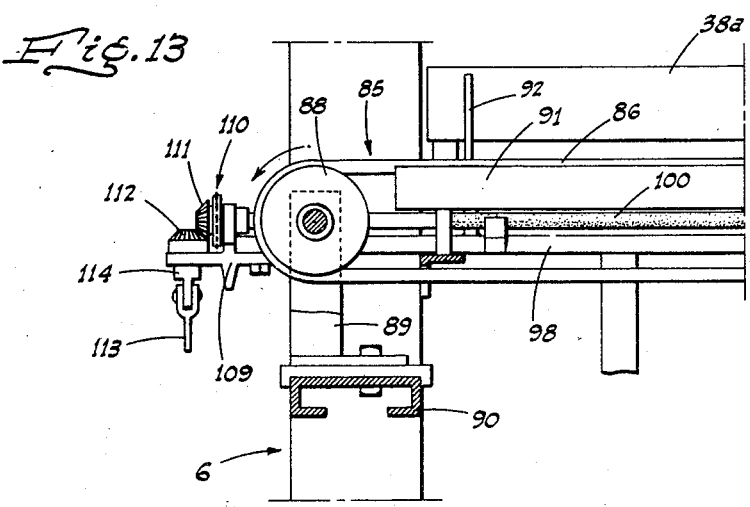

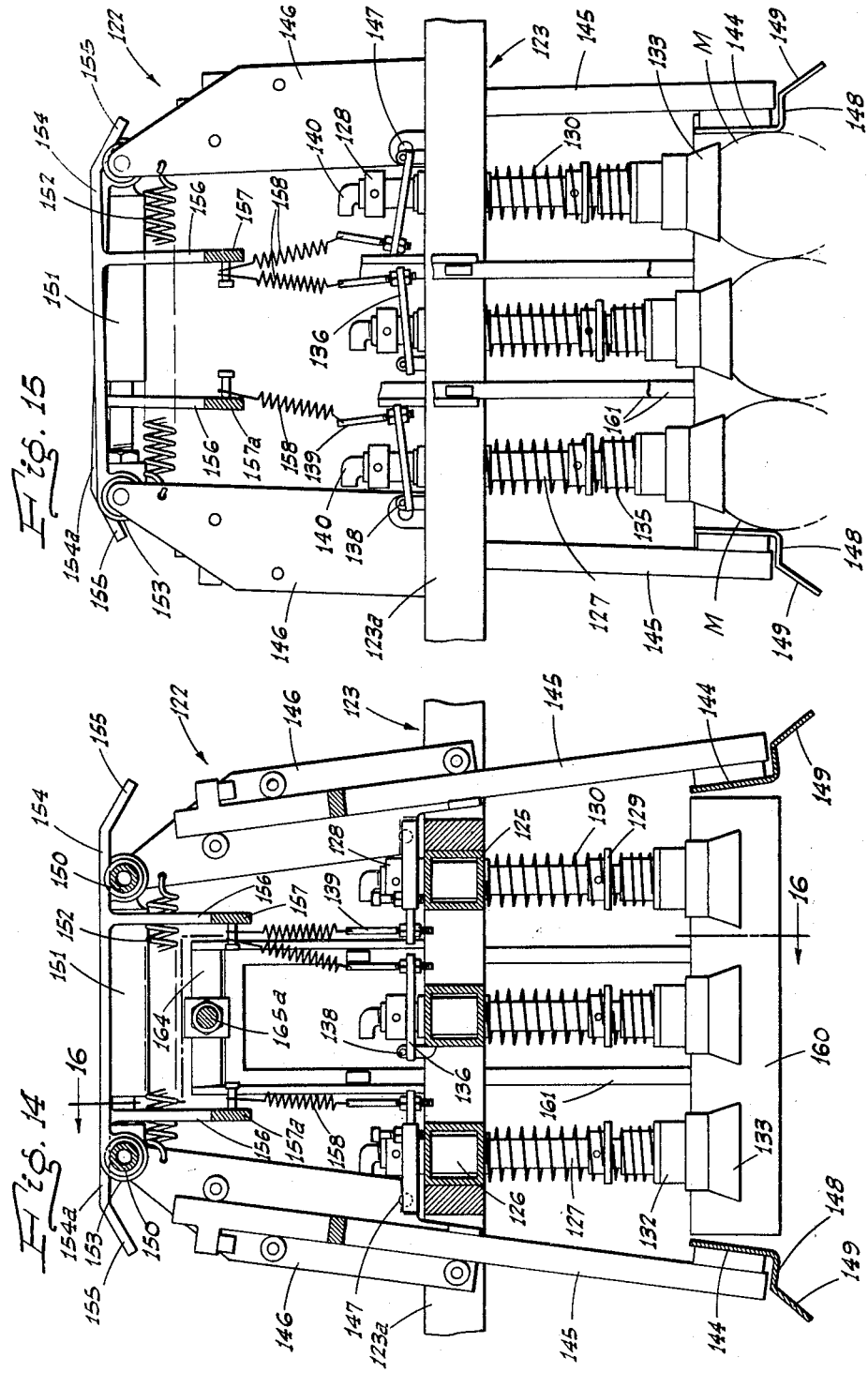

May 18, 1965
M. E. GEE ETAL
3,183,640
CANTALOUPE PACKING MACHINE
Filed May 29, 1962
16 Sheets-Sheet 14
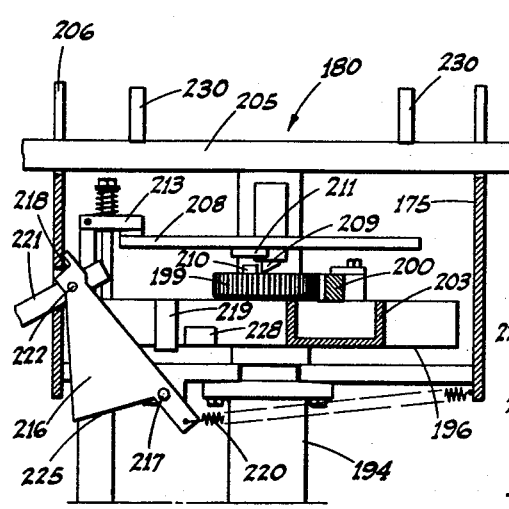
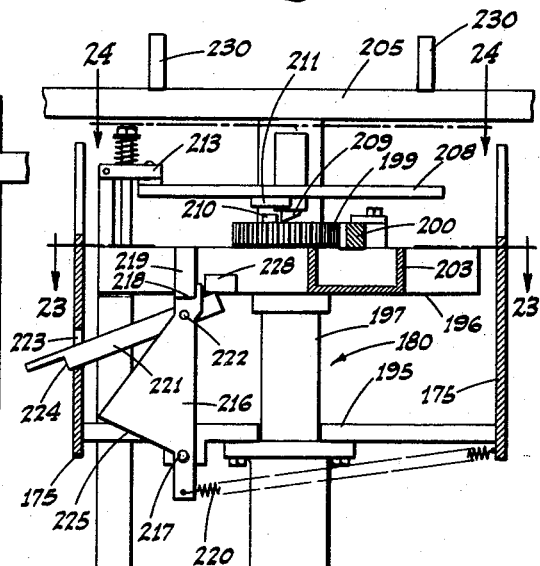
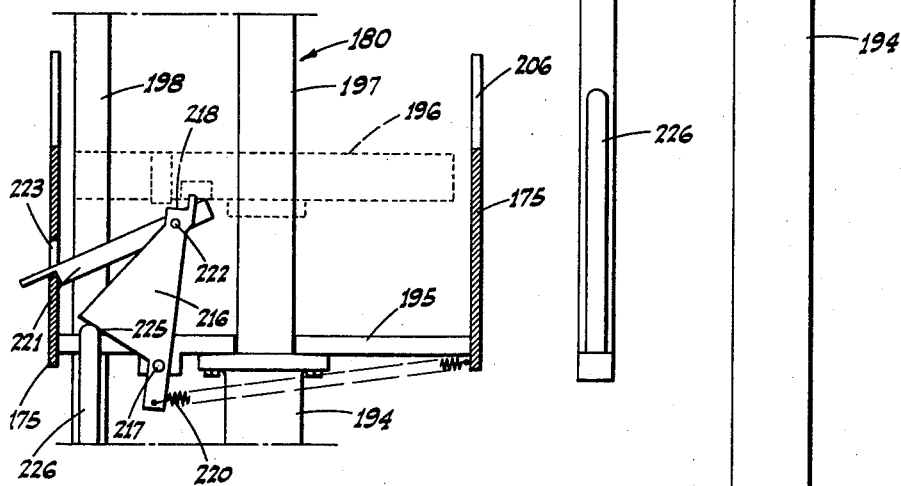
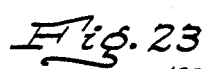
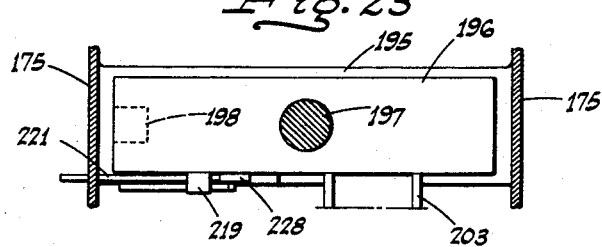

May 18, 1965 M. E. GEE ETAL 3,183,640
CANTALOUPE PACKING MACHINE
Filed May 29, 1962 16 Sheets-Sheet 15
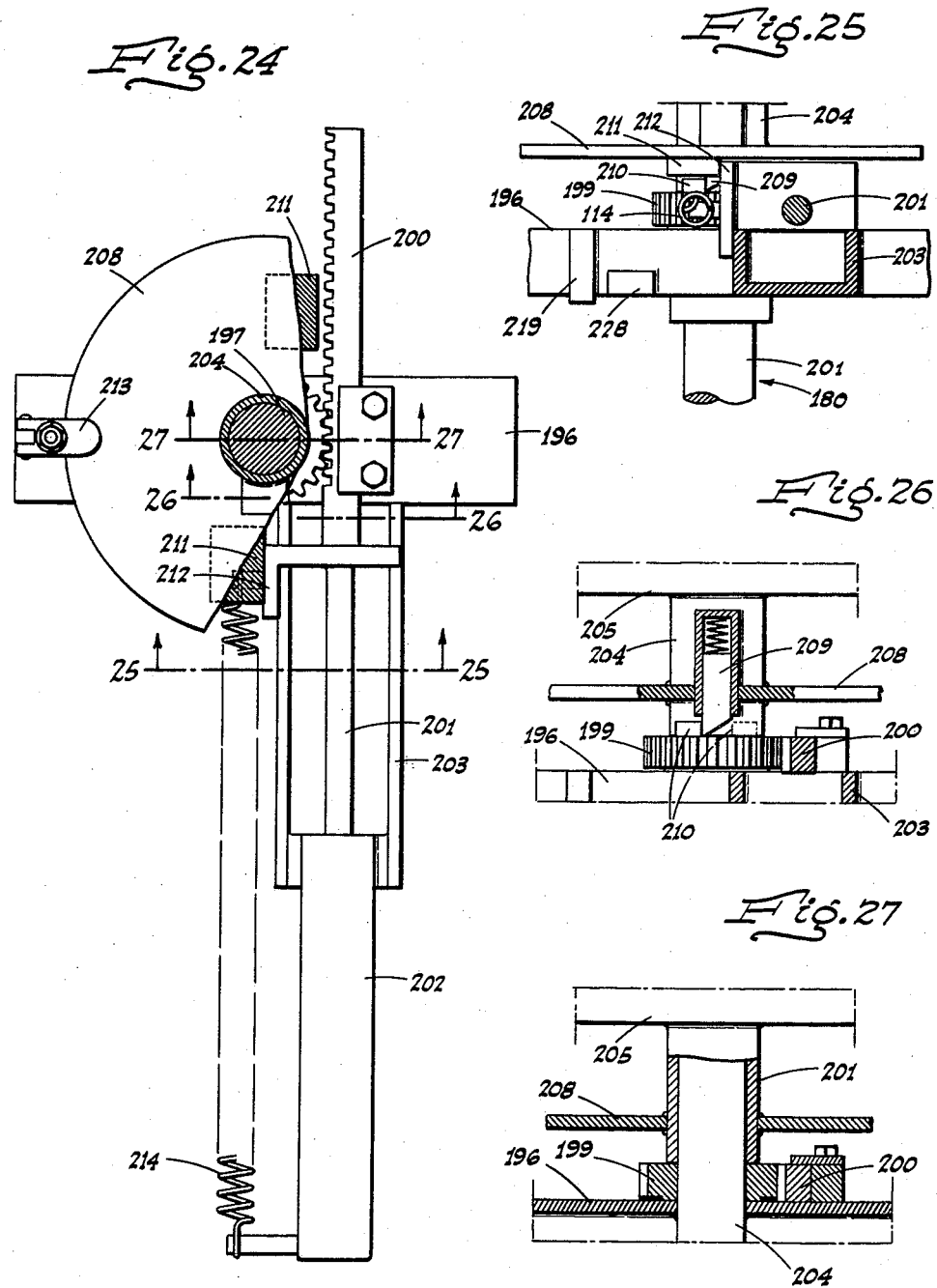

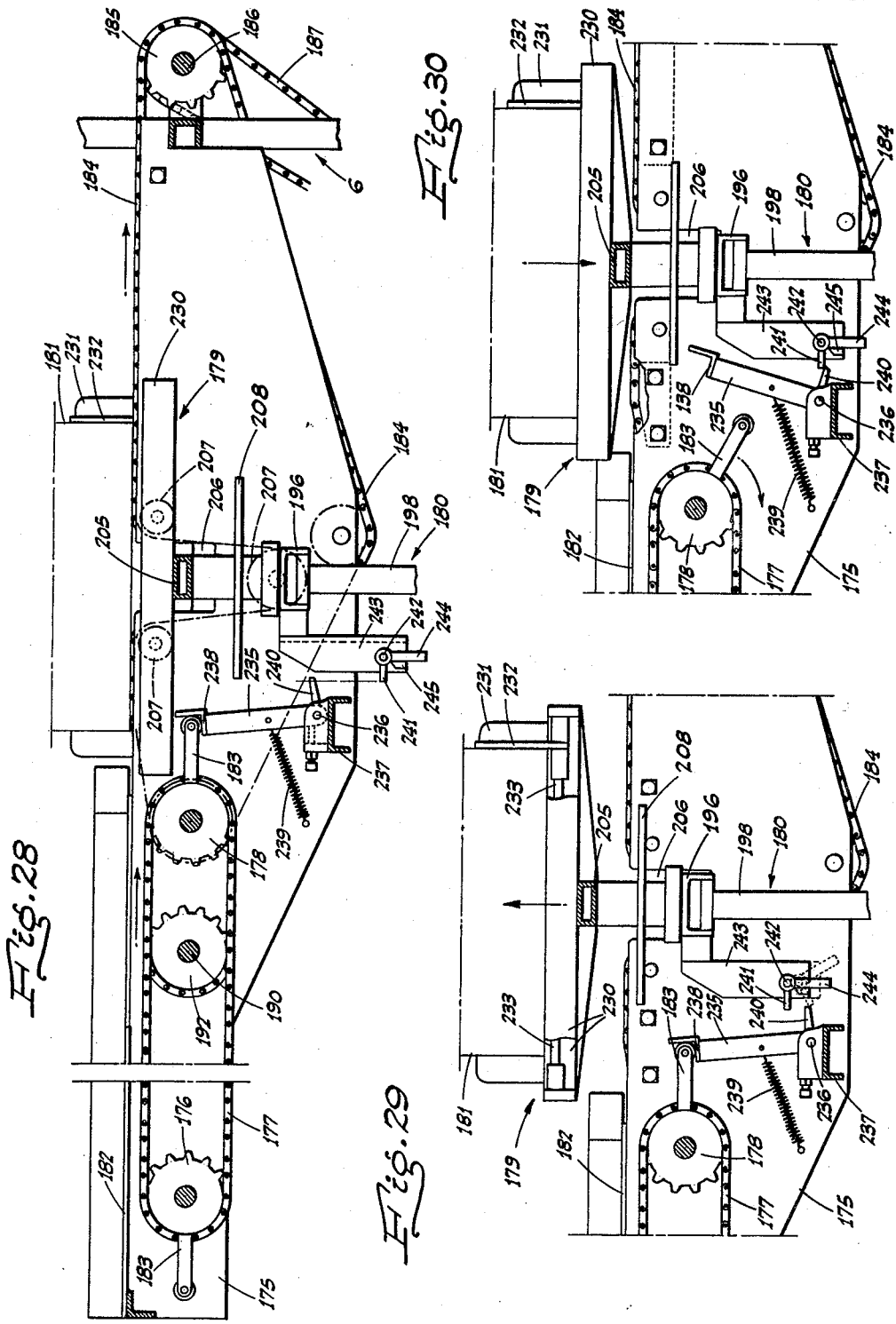

United States Patent Office 3,183,640
Patented May 18, 1965

3,183,640
CANTALOUPE PACKING MACHINE
Minor Eugene Gee, Sanger, and Charles Louis Seagraves, Fresno, Calif., assignors to General Box Distributors, San Francisco, Calif., a corporation of California
Filed May 29, 1962, Ser. No. 198,590
28 Claims. (Cl. 53—78)

This invention relates to the produce packing industry, and particularly to a machine for packing relatively large sized fruit into packing or shipping boxes.

The principal object of this invention is to provide a machine for the purpose by means of which fruit of a certain single variety, pre-graded for size and taken from an initially heterogeneous mass, will become arranged in the form of recurring single-layer patterns each of a size to fit in a shipping box, and each pattern in turn will then be conveyed to and deposited in a shipping box suitably supported on the machine in position to receive such fruit layers.

The machine here shown has been particularly designed to handle melons of the cantaloupe type (hereinafter referred to as "melons") which may be considered as having major or longitudinal axes extending from the stem to the bud end thereof.

In connection with the above feature, another object of the invention is to provide a machine for the purpose by means of which the melons, as taken from the mass, and as then separated into side-by-side rows and advanced, will assume positions with such major axes horizontal and transversely. The pattern of melons-in-rows thus formed is then raised for transfer over the shipping box into which the pattern is to be deposited, and as so raised the major axes of such melons are changed from horizontal to vertical so that the melons are deposited in the box with such axes—and thus the largest dimension of the melons—facing upwardly, as has been found desirable for a certain size or class of melons.

A further object of the invention is to provide means to automatically feed a box into a position in vertical alinement with the pattern of melons to be deposited therein, to maintain the box in such position until the same has been filled, and to then automatically carry the filled box away while at the same time another box is being advanced to such filling position.

As a result of the use of this machine in melon packing operations, such operations will be performed many times faster and with approximately one-fourth of the man-hours required by existing hand-packing methods.

An additional object of the invention is to provide a practical, reliable, and durable cantaloupe packing machine, and one which will be exceedingly effective for the purpose for which it is designed.

These objects are accomplished by means of such structure and relative arrangement of parts as will fully appear by a perusal of the following specification and claims.

In the drawings:

FIG. 1a is a top plan view of the rear portion of the machine.

FIG. 1b is a similar view of the central and forward portions of the machine; these figures combined showing the complete machine.

FIG. 2 is a side elevation of the rear end portion of the machine, showing particularly the initial melon-row feeder.

FIG. 3 is a similar view of the central portion of the machine, showing particularly the melon-row elevating, holding, and advancing units.

It should be noted that in the foregoing figures certain of the relatively small details of construction have been omitted in order to better emphasize the major features of the machine.

Figure 5:
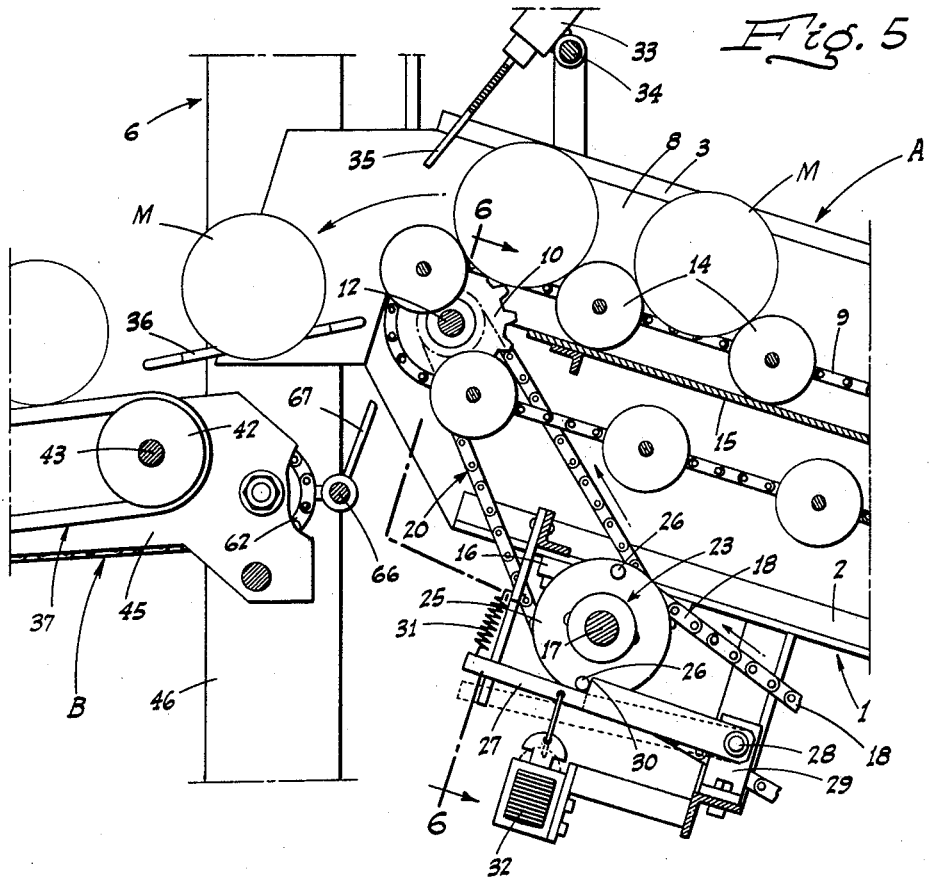

FIG. 5 is an enlarged fragmentary longitudinal section of the melon-row feeder, taken on line 5—5 of FIG. 1a.

Figure 6:
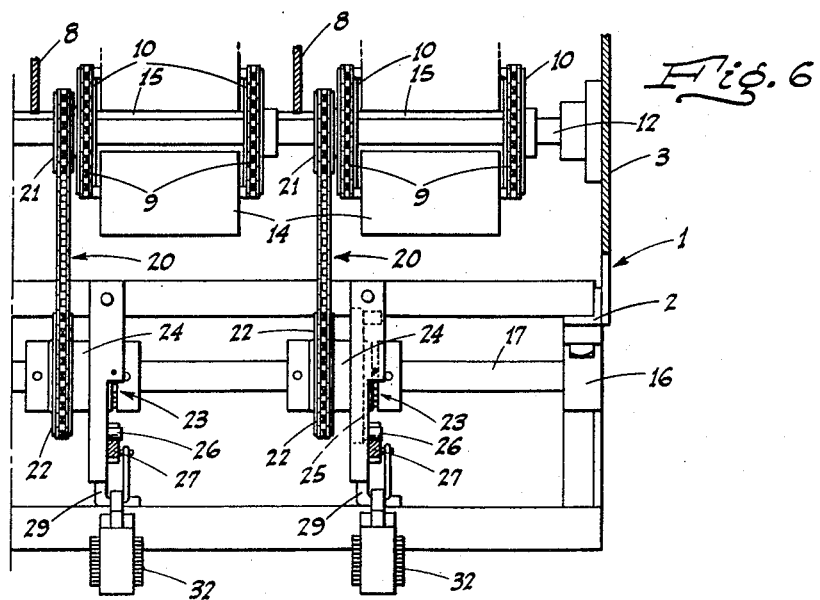

FIG. 6 is a fragmentary transverse section on line 6—6 of FIG. 5.

Figure 7:
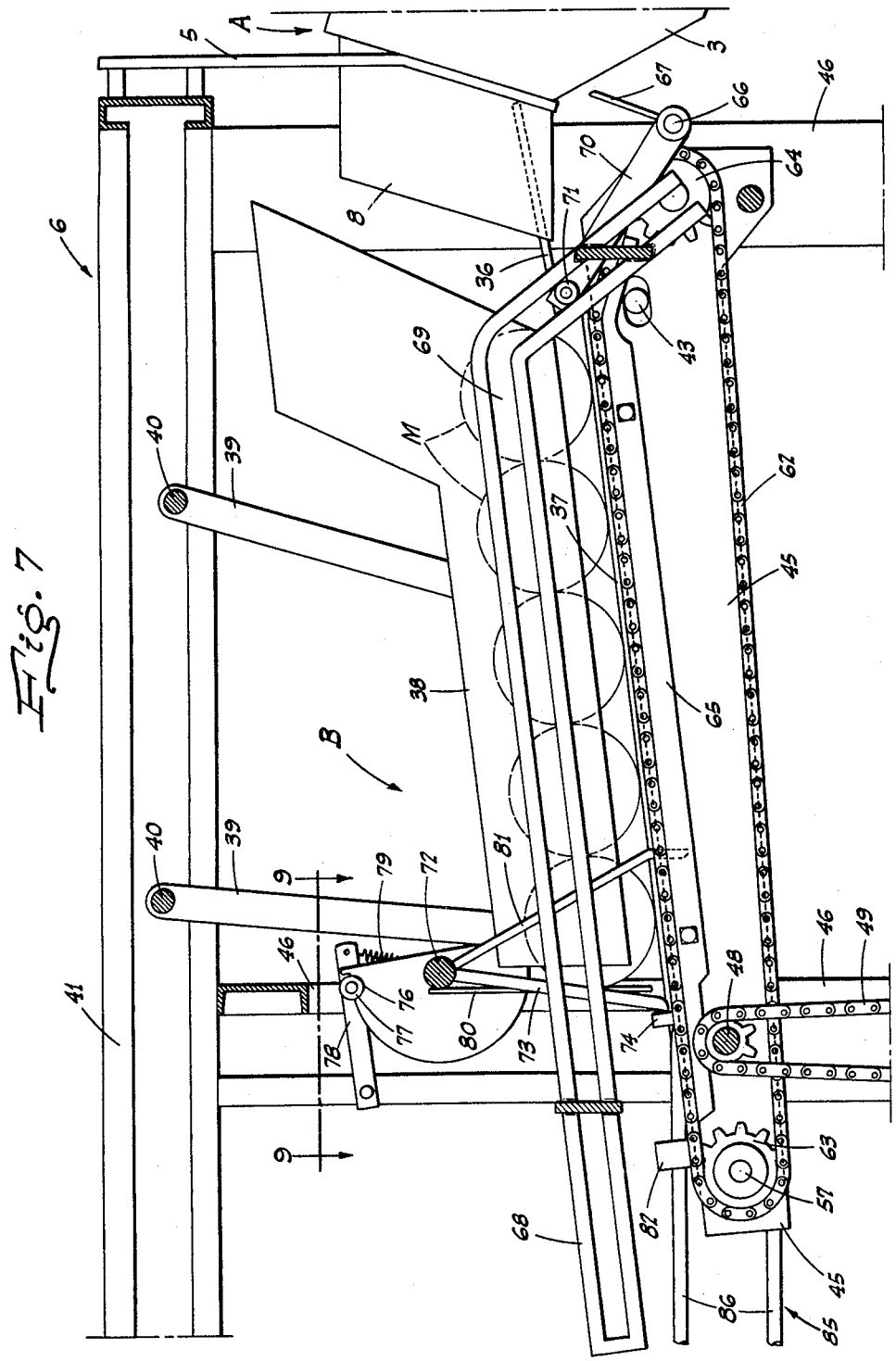

FIG. 7 is a fragmentary enlarged longitudinal section of the machine taken on line 7—7 of FIGS. 1a and 1b, showing a row of melons as assembled in pattern form on the initial conveyor unit.

FIG. 8 is a similar view, showing the melons as advancing from said conveyor unit onto the elevator unit.

FIG. 9 is a fragmentary view of a portion of the drive and control means of said initial conveyor unit, taken on line 9—9 of FIG. 7.

FIG. 10 is a fragmentary enlarged transverse section of the melon supporting and elevating unit, taken on line 10—10 of FIG. 3, and showing the rows of melons in their initial position on the related supporting conveyor.

FIG. 11 is a similar view, but showing the rows of melons as elevated, moved closer together, and about in position for engagement by the suction cups of the carriage.

Figure 4:
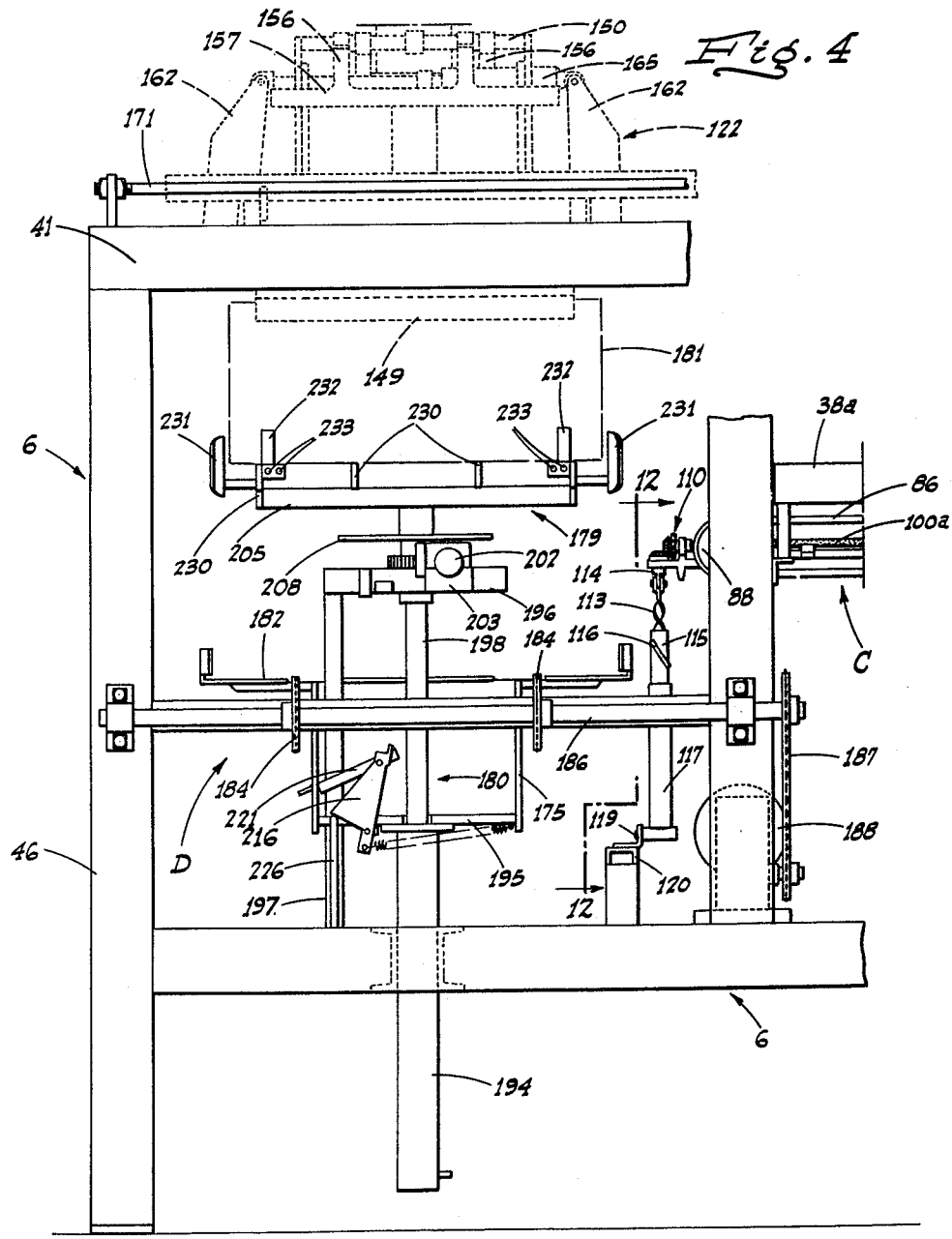
FIG. 4 is a similar view of the forward end portion of the machine, showing particularly the melon-receiving or packing box supporting and elevating unit; the box elevator being shown in its elevated position.

FIG. 12 is an enlarged fragmentary transverse elevation, looking toward the rear end of the machine from line 12—12 of FIG. 4, showing the devices for transferring the melons from an initial transverse-axis position to a vertical-axis position as said melons are elevated to the suction-cup engaging position.

FIG. 13 is a fragmentary longitudinal section taken on line 13—13 of FIG. 12.

FIG. 14 is an enlarged fragmentary transverse section of the melon-supporting and advancing carriage, taken on line 14—14 of FIG. 3, and showing the carriage in its initial or inactive position.

FIG. 15 is a similar view, but showing melons as supported by the carriage and with the side shields thereof as moved in or toward each other.

Figure 16:
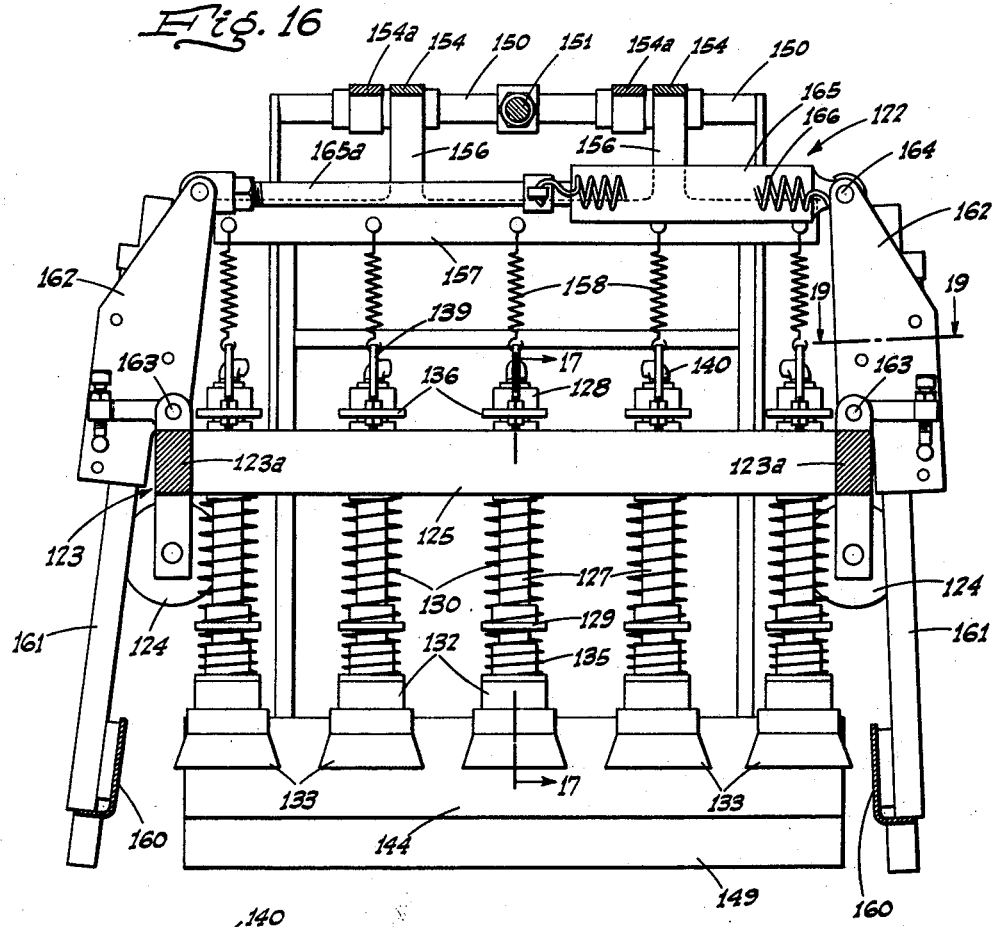

FIG. 16 is a longitudinal section of the carriage, taken generally on line 16—16 of FIG. 14.

Figure 17:
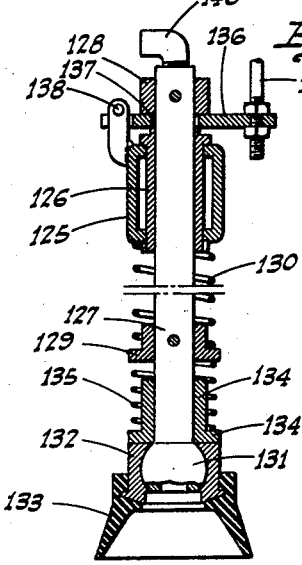

FIG. 17 is a fragmentary enlarged vertical section of one of the melon-engaging suction cup units of the elevator, taken on line 17—17 of FIG. 16.

Figure 18:
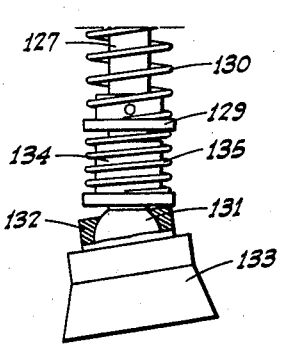

FIG. 18 is a fragmentary elevation of a cup unit, partly in section, and showing the cup as tilted.

Figure 19:
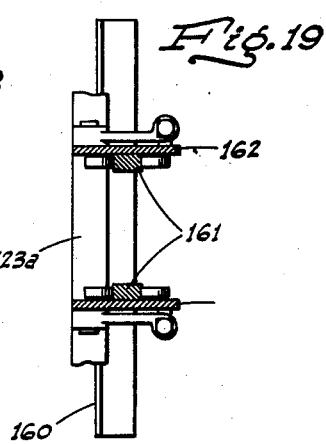

FIG. 19 is a fragmentary sectional plan taken on line 19—19 of FIG. 16.

FIG. 20 is a fragmentary vertical section of the box elevator in a fully lowered position, taken generally on line 20—20 of FIG. 1b.

FIG. 21 is a similar view, but showing the box elevator as partly lowered, after having been fully raised.

FIG. 22 is a similar view, showing the position of the elevator catch or holding member when the elevator is fully raised.

FIG. 23 is a fragmentary sectional plan, taken generally on line 23—23 of FIG. 21.

FIG. 24 is a sectional plan view, partly broken away, of the box-elevator rotating means, taken on line 24—24 of FIG. 21.

FIG. 25 is a fragmentary cross section, taken on line 25—25 of FIG. 24.

FIG. 26 is a similar view taken on line 26—26 of FIG. 24.

FIG. 27 is a similar view, taken on line 27—27 of FIG. 24.

FIG. 28 is a foreshortened enlarged vertical section, taken transversely of the machine but lengthwise of the box conveyor, on line 28—28 of FIG. 1b, showing the box elevator in its lowered position, and then preventing the box-feeding conveyor from functioning.

FIG. 29 is a similar view, but showing the box elevator as being raised.

FIG. 30 is a similar view, but showing the box elevator as being lowered after having been elevated, and releasing the box-feeding conveyor for a box-feeding movement.

Referring now more particularly to the drawings, and to the characters of reference marked thereon, the machine as a whole comprises an initial melon feeding and row-forming unit, indicated generally at A; a row-pattern accumulator unit, indicated generally at B, to which unit A feeds; a final melon-pattern assembly and elevator unit to which unit B feeds, indicated generally at C; and a melon boxing and carry-off unit to which unit C feeds, indicated generally at D.

The unit A, shown in FIGS. 1a, 2, 5 and 6, comprises an elongated frame structure 1 which includes transversely spaced base beams or rails 2, and side panels 3 upstanding from the rails. The structure 1 is set at an upward slope from its lower intake end to its upper end, being supported at its lower end a certain distance from the floor by legs 4, and connected—as by hangers 5—to the adjacent end of the upstanding main frame 6 of the machine, as shown in FIG. 2.

Disposed between the panels is a plurality of endless melon conveyors, indicated generally at 7. These conveyors are on a common level, are spaced apart evenly transversely of the frame structure, and are separated from each other by suitable frame-supported longitudinal partitions 8. The number of conveyors is the same as the number of horizontal rows of melons to be placed in a shipping box; such number being usually three, as here shown.

Each conveyor 7 comprises a pair of transversely spaced endless chains 9 mounted on upper and lower sprockets 10 and 11 respectively. The upper forward sprockets 10 are turnable on a shaft 12 extending between and supported from the side panels 3, while the lower rear sprockets 11 are turnable on a similarly mounted shaft 13; the shafts 12 and 13 being common to all three conveyors, as shown in FIG. 1a. Rollers 14 are connected to and extend between the chains 9 in relatively rotatable relation, being of a size and spaced apart so that the melons being conveyed will be supported by adjacent rollers, as shown in FIG. 5. The rollers when on the upper run of the chains ride on a frame-mounted platform 15 so that as the chains advance, said rollers will turn.

Each conveyor 7 is arranged to be intermittently driven by the following means:

Turnably mounted in bearings 16 supported from and below the base rails 2 adjacent the upper end thereof is a transverse shaft 17. This shaft is constantly driven by an endless chain drive unit 18 from a motor 19 suitably suspended from the frame structure 1, as shown in FIG. 2. An endless chain drive unit 20 extends between the shafts 12 and 17; said unit including an upper sprocket 21 secured to one of the conveyor sprockets 10, and a lower sprocket 22 turnable on shaft 17. A friction or slip clutch 23 connects the shaft 17 and the sprocket 22, being included with the hub 24 of said sprocket. A disc 25 is fixed with the hub 24 and supports diametrically opposed pins 26 adjacent its periphery and which are parallel to shaft 17.

An arm 27 extends tangentially of the disc 25 immediately adjacent the side thereof from which the pins 26 project; said arm at one end being pivoted, as at 28, on a frame-supported bracket 29. Intermediate its ends the arm 27 is formed with a shoulder 30 positioned to engage in front of either one pin 26 or the other relative to the direction of drive of the shaft 17, so as to then prevent rotation of the disc 25 and the drive unit 20 operatively connected thereto; the clutch 23 then slipping.

A spring 31 yieldably holds the arm 27 in a pin-engaging position, and said arm is pulled down to clear the pin and allow the disc 25 to rotate and the drive unit 20 to function, by means of a solenoid 32 or the like supported in connection with the bracket 29 and operatively connected to the arm 27. Counters 33 of any suitable character are supported from a panel-mounted cross shaft 34 disposed above the side panels 3 clear of any possible contact with the melons being conveyed to the upper discharge end of the various conveyors 7; an actuating finger 35 depending from each counter in position to be engaged by each melon in turn moving up the related conveyor and about to drop off the upper end thereof, as illustrated in FIG. 5. In the present machine, the counters are set to register a count of five before the related solenoid is to be deenergized to release the related arm 27 and allow the latter to move to a disc-holding position.

The melons as they are discharged from the upper end of each conveyor 7 fall one by one onto a longitudinally slotted apron 36 from which they roll onto a gently downwardly sloping belt conveyor 37, which comprises a plurality of closely spaced belts, as shown. All of the conveyors 37, which form a part of unit B, are of course alined with the first described conveyors 7, and are separated by suitable partitions 38, which are preferably supported from above by hanger bars 39 which depend from transverse rods 40 mounted in the longitudinally extending top side frame beams 41 of the frame 6. The rear belt pulleys or drums 42 at the intake end of the different conveyors 37 are all fixed on a transverse shaft 43 journaled adjacent its ends in bearings 44 (see FIG. 1a), and which are mounted in connection with longitudinal plates 45. These plates are disposed a short distance laterally inward from the outer side standards or frame legs 46 of frame 6, and are suitably and rigidly secured in connection therewith. The belt pulleys or drums 47 at the forward end of the conveyors 37 are turnable in common on a cross shaft 48 (see FIG. 1b) supported from said plates 45 and the adjacent frame leg 46 (see FIG. 9). The shaft 48 is driven at one end by a chain drive unit 49 operatively connected to a frame supported reversible motor 50 (see FIG. 3).

Adjacent its other end shaft 48 is operatively connected to shaft 43 by a chain drive unit 52, as shown in FIGS. 1a and 1b. This unit includes an end sprocket 53 turnable on shaft 43 and which carries a radial block 54 on one side, and which—on one side or the other—engages a pin 55 projecting from one side of a collar 56 fixed on said shaft 43. By reason of such specific drive connection, there will be a lag in the rotation of shaft 43 in opposite directions as the direction of rotation of the chain drive unit 52 is reversed, as will be obvious.

Another cross shaft 57 extends between and is journaled in connection with the plates 45 a short distance ahead of shaft 48, and at one end is operatively connected thereto by a chain drive unit 58. This unit includes a sprocket 59 turnable on shaft 57; the hub of said sprocket and a collar 60 fixed on said shaft together forming a friction or slip clutch 61, as shown in FIG. 9.

Endless chains 62 extend rearwardly from shaft 57 laterally out from and adjacent the plates 45, each chain at its forward end being trained about a drive sprocket 63 fixed on shaft 57. At its rear end each chain 62 passes about a direction-changing sprocket 64 mounted on the adjacent plate 45 at a point a short distance rearwardly of and below the transverse conveyor shaft 43, as shown for instance in FIG. 8. The upper runs of chains 62 are disposed for the major portion of their length at a level adjacent that of the upper runs of the belt conveyors 37, and parallel thereto. As they approach their rear ends, however, said upper runs are disposed at a downward slope to the adjacent sprockets 64, as clearly shown; said runs throughout practically their full extent riding on rails 65 secured against the laterally outer faces of the plates 45.

Turnably mounted on and extending between the chains 62 is a cross shaft 66, movable in a plane between the upper runs of the conveyors 37 and the lower edges of the partitions 38. Between each pair of such partitions, and thus in transversely alined relation with the various conveyors 37, an upstanding pusher plate 67 of a height sufficient to engage the rear face of any melon on the related conveyor 37, is fixed with the shaft 66. Laterally out from one of the chains 62, and between such chain and the adjacent frame legs 46, a longitudinally slotted guide bar 68 is fixed against the laterally inner faces of these legs. The major portion of the length of this bar is parallel to the upper run of the adjacent chain 62; such portion extending from a point a relatively short distance ahead of the shaft 57 to a point adjacent the vertical plane of shaft 43. From this point said bar, and of course the slot 69 therein, extends downwardly with a somewhat abrupt rearward angle, to a termination adjacent the sprocket 64.

A radial arm 70 is fixed on the end of shaft 66 between the bar 68 and the adjacent chain 62 and projects forwardly from said shaft. At its forward end the arm 70 carries a roller 71 riding in the slot 69. The parts just above described are arranged so that when the shaft 66 is at its rearmost position on the chains 62, as when at the start of a melon advancing operation, as shown in FIG. 7, the roller 71 is riding in the sloping or angled portion of the slot 69, and the pusher plates 67 are below and clear of any melons rolling down the aprons.

A cross shaft 72 is turnably supported from the frame legs 46 which support the shaft 48 slightly to the rear of but well above the same, so as to allow melons to roll under said shaft 72 without interference. Shaft 72 adjacent one end supports a rigid normally depending finger 73 which is alined, in a longitudinal vertical plane, with the adjacent chain 62, and when the shaft 66 is at the rear end of the chain as above described, engages a stop lug 74 fixed with and upstanding from said chain, as shown in FIG. 7. At its opposite end, a disc 75 is fixed on the shaft 72, and which disc is formed with a peripheral notch 76 normally engaged by a latching roller 77 mounted on an arm 78 which is engaged by a spring 79 acting to yieldably hold the roller seated in the notch. Normally depending melon-stop plates 80 are fixed on the shaft 72 in the path of melons rolling down the various conveyors 37.

Another finger 81 depends from and is rigid with shaft 72 in a position clear of any melons and of a length to engage the top surface of the shaft 66 when the latter has advanced to its forward limit of travel and is engaged with a stop lug 82 fixed on and upstanding from one of the plates 45 adjacent the shaft 57, as shown in dotted lines in FIG. 8, and which is when the rows of melons have advanced and have swung the stop plates 80, and parts connected thereto, forwardly.

The melons advanced from each of the conveyors 37 roll onto another conveyor 85 which forms a part of unit C, and which is horizontal or non-sloping; the previously described partitions 38 having extensions 38a which project substantially to the forward ends of the conveyors 85 to maintain the rows of melons thereon in separated relation to each other. Each such conveyor 85 comprises a pair of conveyor belts 86 of generally circular form in section; the rear pair of belts being trained about pulleys 87 (see FIG. 1b) which are fixed on the shaft 48 at the ends of the pulley drum 47 of the related conveyor 37. At their forward ends, the belts 86 pass about other pulleys 88, which are supported in transversely spaced relation to each other by brackets 89 upstanding from a frame-mounted cross beam 90. See FIGS. 1b, 12, and 13. The upper runs of the belts 86 are cradled and supported against lateral or downward deflection by longitudinal frame-supported bars 91. See FIGS. 10, 11, and 13 particularly. Forward movement of each row of melons along the upper runs of the belts 86 as the latter are driven forwardly is stopped by the engagement of the foremost melon of such row with upstanding stop pins 92. These stop pins are mounted in a particular manner, as will shortly be seen.

The rows of melons M on all of the belts 86 are simultaneously lifted from said belts to a predetermined height thereabove by an elevator unit 93 constructed specifically as follows:

Suitably supported from the frame 6 in a transverse position centrally of the three pairs of belts 86, and also in a longitudinal position generally centrally of the rows of melons on said belts 86, is a vertical hydraulic cylinder 94 having an upstanding piston rod 95; the cylinder and rod being disposed below the belts 86.

A platform 96 is mounted on the piston rod and supports rigid upstanding posts 97 spaced lengthwise of the central pair of belts 86 and midway therebetween, as shown in FIG. 10. The posts at their upper end support a horizontal longitudinal bar 98 which extends between the forward pulleys 88 from a front end termination a short distance ahead of said pulleys, as shown in FIG. 13, to a rear end termination a short distance rearwardly of the post 97, as shown in FIG. 3. The bar 98, rearwardly of the pulleys 86, carries longitudinally spaced saddles 99 at the sides thereof, which turnably support knurled or otherwise rough-surfaced rods 100 which are transversely spaced a distance somewhat less than the spacing of the adjacent belts 86, as shown in FIG. 10, and when the piston rod 95 is in its lowest position are below the upper run of said belts 86. When the piston rod is raised, the melons on the belts 86 are engaged by the rods 100 and are raised thereby, as shown in FIG. 11. The foremost melon is still engaged by the stop pins 92, since said pins are mounted on and upstand from the bar 98, as shown in FIG. 12.

Similar bars 98a and turnable rods 100a supported thereby, are operatively associated with the side pairs of conveyor belts 86, as clearly shown. Posts 101 depend from each bar 98a; said posts being rigidly connected together at their lower ends above the platform 96 by a longitudinal bar 102, which is pivotally mounted on the platform, as at 103, the posts 101 being initially vertical, as shown in FIG. 10.

A cam arm 104 is rigid with and depends from each bar 102 at the rear end thereof; the upper portion of the arm being initially vertical, while the lower portion, and particularly the laterally inner edge 105 thereof, slopes laterally inward to its lower end. Such laterally inner edge is engageable by a roller 106, which initially rides against the top portion of the arm, as shown in FIG. 10, and is mounted on a frame-supported cross bar 107. A tension spring 108 extends between and connects the two arms and yieldably pulls the same laterally toward each other.

By reason of the above described cam-arm and roller arrangement, the two laterally outermost sets of rods 100a, as they are raised to engage and lift the initially belt-supported and transversely spaced rows of melons, are gradually shifted laterally inward toward each other so that the three rows of melons—the middle row of which moves straight up—are brought close together.

At the same time the melons—which are initially positioned with their major or longitudinal axes L horizontally in a transverse direction, as shown in FIG. 10—are rotatably shifted so that such axes are disposed in a substantially vertical position when the supporting rods 100a reach their topmost position, as shown in FIG. 11. This shifting movement is imparted to the melons by a means which is particularly shown in FIGS. 12 and 13.

Such means comprises, for each of the melon-lifting units above described, a bracket 109 secured to the forward end of each bar 98 or 98a. The rods 100 (or 100a) are journaled in the corresponding bracket and are connected at their forward end by a chain drive unit 110. One of the sprockets of such unit is rigid with a bevel gear 111 which engages another bevel gear 112 journaled in the bracket 109 with its axis normally vertical.

A helically twisted strap, forming in effect a long-pitch threaded rod 113, is pivotally connected to and depends from the axial spindle 114 of the gear 112, and slidably and turnably projects into a normally vertical sleeve 115. This sleeve includes an angularly disposed element 116 projecting into the interior of the sleeve and engaging in the thread-forming groove or twist of the rod 113. The sleeve slidably and adjustably depends into a tubular support 117, which is pivoted at its lower end, as at 118, on an ear 119 mounted on a cross bar 120 on frame 6.

The support 117 and sleeve 115 are stationary as regards rotation, and it will thus be seen that as the related bar 98a, for instance, and parts connected thereto, are lifted by the action of the elevator unit 93, the rod 113 as it is pulled out of the sleeve 115 will be rotated. This rotation, through the bevel gears, rotates the melon-supporting rods as well. Said rods, having roughened surfaces, frictionally engage the melons and turn the same so that their major axes L finally assume a vertical position, as shown in FIG. 11.

By reason of the fact that the sleeve is adjustable in the support 117, the number of rotations that will subsequently be imparted to the related member 113 and parts connected thereto as the melon-supporting rods are raised by the elevator action will be varied, as will be evident. In this manner melons of different sizes may be rotated through the necessary 90 degree arc as they are being raised from their initial belt-engaged position to their fully raised position.

The lifted melons are then engaged and supported by a carriage 122 above the same, and itself supported on the frame 6. Said carriage, as shown in FIGS. 1b and 3, and particularly in FIGS. 14-19, is constructed as follows:

Said carriage includes a horizontal frame 123 which comprises front and rear cross beams 123a extending the full distance between the top side beams 41 of frame 6. The beams 123a at their ends carry rollers 124 which ride in said beams 41; the latter, being of a channel form and in section and facing each other, serving as rails supporting and guiding the rollers.

Carriage-mounted longitudinal beams 125 extend between and are detachably secured to beams 123a, and are spaced apart transversely the same as the transverse spacing of the melon rows when lifted, as previously described and as indicated in FIG. 11. Each beam 125 supports a row of vertical bushings 126 along its length, through which vertical tubular cup-stems 127 are slidable. As here shown, there are five of such stems, spaced apart evenly a distance substantially equal to the diameter of a melon. A stop collar 128 is fixed on each stem above the beam 125, and another stop collar 129 is fixed on the stem some distance below said beam; a compression spring 130 embracing the stem 127 and extending between and engaging the collar 129 and the under side of beam 125. The lower end of each cup-stem is provided with a bulbous head 131, open to its lower end as shown in FIG. 17, and which is rockably or swivelly embraced by a neck 132 from which a flaring rubber or similar suction cup 133 depends. A short sleeve 134 is slidable on the stem 127 immediately above the neck 132, and normally has flat contact with the top surface of the neck, as shown. A compression spring 135 embraces said sleeve and extends between the under side of the stop collar 129 and the base flange 134a of the sleeve 134 and yieldably holds the latter against the neck 132; thus exerting a pressure on said neck which will hold the same against unduly free rocking movement on the head 131.

A normally horizontal plate 136 is disposed between the collar 128 and the upper end of bushing 126; said plate having a bore 137 through which the cup-stem 127 projects with a loose fit. The plate 136, which extends transversely of the beam 125, is pivoted at one end from the adjacent side of the beam, as at 138; the spring 130 acting to normally maintain the collar 128 in contact with said plate and the latter in contact with the top of the bushing 126, as shown in FIG. 17. An upstanding rod 139, operatively connected to a pull-up device, as will be seen later, is attached to the other end of plate 136.

Each cup-stem 127 at its upper end is fitted with a pipe elbow 140 which is connected by a flexible hose 141 (see FIG. 1b) with the outlet manifold (not shown) of a suction pump and drive motor unit 142 which is mounted in upstanding relation on the frame 6 adjacent one side thereof; said unit when in operation thus exerting a suctional action in all the cups 133 simultaneously.

Longitudinally extending presser plates 144 are disposed in spaced relation transversely of the cartridge 122, and a short distance laterally out from the cups 133 of the rows. The plates 144 are rigid with upstanding arms 145, spaced lengthwise of the carriage, and the upper portions of which—above the beams 123a—slidably engage between other upstanding arms 146, as shown in FIG. 14. The pairs of arms 145 and 146 thus form telescopic units; said arms being held against buckling movement relative to each other, and the upper arms 146 being pivoted, as at 147, on the carriage frame. The plates 144 are normally disposed at a level relative to the cups 133 such as to engage melons held by said cups 133 substantially midway of the height of such melons, as indicated in FIG. 15. The plates are formed with flanges 148 along their upper edges, and which flanges project laterally out to rest on the top of the side edges of the packing box into which the melons are finally discharged, as will be seen later. At their outer edges the flanges 148 are formed with depending outwardly flaring box locators 149.

At their upper ends the arms 146 of each pair are connected by a circular bar or shaft 150; the two opposed shafts being connected intermediate their ends by a power cylinder unit 151; this unit being normally contracted and the arms 146 being then disposed with a slope toward each other from their pivots 147, as shown in FIG. 14. The purpose of this arrangement will be made clear hereinafter. Compression springs 152, one on each side of the cylinder unit 151, yieldably hold said unit contracted and the arms 146 in such sloping relation.

Pivotally mounted at one end on one shaft 150, as at 153, in spaced relation lengthwise of the cartridge 122 are cross straps 154. These straps, toward their opposite ends, slidably rest on the other shaft 150 and beyond said shaft are formed with downturned end portions 155. Arms 156 depend from the straps 154 adjacent and laterally in from said other shaft 150 and at their lower ends support a bar 157 which extends lengthwise of the carriage 122 and some distance above the beams 125.

This bar serves as a means to support depending pull springs 158, one for each plate 136 of a row, and connected to the upstanding rod 139 thereof. A similar pair of cross straps 154a is mounted in opposed relation to the straps 154, and similarly support a bar 157a which connects other ones of the springs 158 to the upstanding rods 139 of the plates 136 of the other row, as clearly shown in FIG. 15.

By reason of the above described features of construction, it will be seen that should any of the cup-stems 127 be raised by a melon being pushed into the related cup 133 from below, the adjacent collar 128 will be raised clear of the corresponding plate 136, allowing the related spring 158 to cant the plate. Then, upon the subsequent and immediately following extension of the cylinder unit 151, the opposed shafts 150 will be moved apart as the arms 146 are swung about their pivots 147 to bring the presser plates 144 into pressing engagement with the cup-held melons, as shown in FIG. 15. With such separation of the shafts 150, the downturned end portions 155 of the different straps 154 and 154a engage and ride up on the corresponding shafts 150; thus imparting a lift to the related straps. This places the springs 158 under greater than initial tension, which causes the various plates which have been previously canted to be pulled into binding engagement with the related cup-stems 127 and thus holding them from downward movement until the shafts 150 and the straps 154 and 154a are returned to their initial positions.

Other presser plates 160 extend transversely of the carriage 122, at the front and back of the rows of suction cups 133, in position to engage melons held by the endmost cups and adapted to rest on the ends of a packing box. These plates 160, like the plates 144, are secured to upstanding arms 161 which slidably telescope into upper arms 162 spaced transversely of the carriage 122 and which are pivoted on the carriage frame 123, as at 163. Each pair of arms 162 is connected at their upper ends by a cross shaft 164; the two shafts being connected by a power cylinder unit 165 which is normally contracted. Tension springs 166 on opposite sides of the cylinder unit connect one shaft 164 and the piston rod 165a of the unit 165 to yieldably maintain the power unit contracted, and the presser plates 160 relatively far apart.

The carriage 122 is arranged for reciprocating movement along the top side frame beams 41 between a position directly overlying the elevator unit 93, as shown in FIG. 3, and a forward position overlying the melon packing station, as will be seen later. As particularly shown in FIG. 1b, such reciprocation is imparted to the carriage in a forward direction by means of an initially contracted one-way power cylinder unit 167. This unit extends lengthwise of the carriage 122 and frame 6 adjacent one of the longitudinal beams 41 thereof. The piston rod 168 of this unit projects from the rear end of the cylinder and is anchored to a bracket 169 secured to the adjacent beam 41. The cylinder of said unit 167 is suitably secured to the frame 123 of the carriage 122.

Rearward movement is imparted to the carriage 122 by another one-way power cylinder unit 170, disposed parallel to and adjacent the power unit 167. This unit is normally extended, however; the piston rod 171 thereof being anchored to the rear end of the frame 6, as shown at 172, while the cylinder itself is suitably secured to the carriage frame 123.

The packing-box supporting, conveying, elevating, and turning mechanism included in unit D is at the forward end of the machine, in a position such as to dispose a box in position to receive one layer at a time of melons as supported by the carriage 122, as previously described, and when said carriage is advanced to a predetermined position over the above noted mechanism. Such mechanism, which is particularly shown in FIGS. 1b, 4, and 20-30, extends as a whole transversely of the machine, or at right angles to the direction of travel of the melons from the rear end of the machine to the point of loading, and is constructed as follows:

Extending from one side to the other of the machine and its main frame 6, and supported from the latter, is a pair of mounting plates 175. These plates are set on edge and are thus vertically disposed, and are spaced apart lengthwise of the machine. Also, said plates are at a level a distance below the main top side frame beams 41 greater than the height of a packing box.

The rear ends of these plates, when considered in connection with the direction of movement of the box conveyor structure now to be described, are some distance laterally out from one side of the frame 6, as shown in FIG. 1b. The rear sprockets 176 of a pair of endless feed chains 177 are supported from plates 175 adjacent the rear ends thereof; the front sprocket 178 of these chains terminating just short of the box-supporting elevator platform 179 of an elevator 180. This elevator, which will be described in detail hereinafter, is disposed so as to be centrally of the melon-supporting portion of the carriage 122.

A box 181 to be loaded however does not rest on these chains, but on fixed platforms 182 disposed parallel to the upper runs of the chains 177 but a small distance above the same, as shown in FIG. 28. A box placed on the platforms 182 directly over the chains 177 is engaged at its rear end, when the upper runs of the chains are advanced toward the elevator 180, by a radial lug 183 projecting from a link of each chain. Each chain also carries another similar lug at a point midway of its length from the first named lug, so that when said first named lug is in a horizontal position back of the box and below the platforms 182, the other lug will be in a similar position at the forward end of the chain, as shown in FIG. 28. The purpose of this arrangement will be seen later.

A pair of box-conveying and discharge chains 184 is trained about end sprockets 185, the forward end ones of which are mounted on a common shaft 186 supported from frame 6 adjacent but laterally out therefrom, said shaft being connected by a chain drive 187 driven by an electric motor unit 188 which is mounted on the frame 6 at a suitable point thereon (see FIG. 4), and which is constantly driven when the machine is in operation. The upper runs of chains 184, which are positioned laterally out some distance from the chains 177 and the plates 175, are in the main on a level with the platforms 182, and slightly above the top level of the plates 175, as shown in FIG. 28.

One of the chains 184 is drivingly connected to the feed chains 177 in the following manner:

The rear end sprocket of such chain is connected to the adjacent sprocket of a short endless chain unit 189 which at its rear end is turnable on a cross shaft 190 journaled in connection with the plates 175. The chain unit 189 at its rear end is connected in driving relation with the shaft 190 by a friction slip-clutch, indicated at 191. The shaft 190 in turn is connected to the forward end sprockets 178 of the chains 177 by endless chain drive units 192. This arrangement is clearly shown in general in FIG. 1b.

The elevator 180 above mentioned comprises an upstanding power cylinder unit 194 disposed centrally between the plates 175 and rigidly secured thereto by suitable means which includes a cross plate 195 adjacent the bottom edges of the plates 175, as clearly shown. A cross beam 196 is secured to the piston rod 197 of the unit 194 above the plate 195 and extends transversely between the plates 175; being held against rotation by means of a post 198 which depends from one end of the beam 196 and slidably projects through the cross plate 195.

The piston rod 197 projects through and above the beam 196 some distance, as shown in FIG. 27, and turnable on said rod immediately above the beam 196 is a pinion 199. This pinion is engaged by a rack 200, which is secured on the outer end of the piston rod 201 of a power cylinder 202; said rack, piston rod, and cylinder being disposed parallel to the plates 175 and between the same, and the cylinder being supported on an arm 203 projecting from and rigid with the cross beam 196.

Turnably mounted on the rod 197 above the pinion 199 is a sleeve 204 which supports the central transverse base beam 205 of the elevator platform 179. This beam is considerably wider than the spacing between the plates 175, and since when the platform is fully lowered said beam is below the upper edges of the plates 175, the latter are recessed for some distance from the top down, as shown at 206, to accommodate this cross beam, as shown for instance in FIGS. 20 and 28. It may here be noted that since the upper runs of the box conveying chains 184 cut across the path of downward movement of the beam 205 into the recesses 206, said upper runs of the chains are deflected downwardly, as by a suitable direction-changing roller arrangement, as indicated at 207 in FIG. 28, to clear such recesses.

Rigid with the sleeve 204 intermediate its ends is a disc 208, in which is mounted a depending spring-advanced pawl 209 (see FIG. 26). This pawl overlies the pinion 199, in position for engagement on one side by one or the other of a pair of diametrically spaced lugs 210 upstanding from the pinion. Depending from the underface of the disc 208 are diametrically opposed lugs 211, positioned to alternately engage against a stop 212 fixed with the piston rod when the latter is fully advanced, as shown in FIG. 24, and at which time one of the lugs 210 is in engagement with the pawl 209. A suitable brake unit 213 engages the disc 208 and prevents free rotation thereof.

By means of this arrangement, the disc 208, and of course the platform 179 fixed therewith, will be rotated through a half-turn, or 180 degrees, upon and by reason of the advance of the piston rod 201 and the rack 200 from their initially retracted position; the stop 212 advancing with the rod 201 so as to be in position to be engaged by one of the stop lugs 211 when such half-turn is completed. Upon the rack 200 being subsequently retracted, the disc 208 remains in the position to which it has been turned by reason of the brake action, and the pinion 199 is rotated in the opposite direction through a half-turn; said one lug 210 backing away from the pawl 209 and the other lug 210 lifting and moving past the pawl and assuming a position directly behind the same in position to immediately push against said pawl and thereby rotate the disc with the next advancing movement of the piston rod. A tension spring 214 extends between the cylinder 202 and the member 212 to retract the rod 201.

The elevator platform 179 and the box supported thereon can of course be turned in the above manner only after it has been raised from its lowest position sufficient for the cross beam 205 to be clear of the recesses 206. It may be here noted that, in the operation of the above described elevator, the platform 179 is first raised from its lowest position after a box has been received thereon sufficiently to disposed said box in a position to cooperate with the advanced carriage 122 and receive a row of melons therein from said carriage, as indicated in dotted lines in FIG. 4. The platform is then lowered to a point short of its lowest position but so that it is clear of the plates 175 and the supported box is clear of the carriage above. The platform 179 is then held in such position without relying on the pressure in the cylinder while the platform is rotated in the manner above described, and it is then again raised to receive another row of melons from the carriage. Following that, the platform is lowered the full distance so that the box rests on the chains 184, ready to be carried away thereby.

The above noted holding of the elevator platform 179 is automatically effected by the following device; reference being particularly had to FIGS. 20–22. Such device comprises an upstanding catch or holding plate 216 pivoted adjacent its lower edge on and against the plate 195 at a point laterally between the cylinder unit 194 and one plate 175, as shown at 217. At its upper end the plate 216 is formed with a right-angle notch 218 facing said plate 175. This notch, when the plate 216 is in a position with said notch in vertical alinement with the pivot 217, is adapted to be engaged in holding relation by a lug 219 fixed on the adjacent side of the beam 196, as shown in FIG. 21.

A tension spring 220 connects the plate 216 below the pivot 217 and the opposite plate to maintain the notch yieldably engaged with said lug. A trigger finger 221 is disposed in a plane between the beam 196 and the plate 216, and is pivoted on said plate just below the notch and adjacent one end, as at 222, so that said finger at said end projects a short distance beyond the plate 216, as shown. The finger at its other end projects through a vertical slot 223 in the adjacent plate 175, and is formed at said other end with a downwardly facing finger notch 224. This notch is adapted to engage the plate 175 at the lower end of the slot 223 and to then hold the plate 216 turned on its pivot so that the notch 218 is backed away slightly from the lug 219, as shown in FIG. 22. The plate 216 is formed, at the bottom and radially of the pivot 217, with an upwardly sloping cam edge 225, which extends in the direction of the adjacent plate 175. This edge overlies and is engaged, upon the elevator platform 179 arriving close to its topmost position, by a vertical pin 226 fixed in connection with the guide post 198.

With the above construction and arrangement of parts of the elevator platform holding device, said device functions in the following manner:

When the platform 179 is in its lowest position the finger 221 projects freely through the slot 223; the holding plate 216 having been turned on its pivot by the pull of the spring 220 so as to rest at its upper end against the adjacent plate 175. This position of the device is shown in FIG. 20. By the time the platform reaches its topmost position, the edge 225 of the plate 216 has been engaged by the pin 226, and said plate has been turned away from the adjacent wall plate 175 a sufficient distance to place the notch 218 substantially in a position for engagement by the lug 219, as indicated in FIG. 22, upon descent of the platform 179. At the same time, the finger 221 has been pulled out of the slot 223 to a position such that the notch 224 will engage the plate 175 at the bottom of the slot in holding relation, as previously described and as shown in FIG. 22, and thus holding plate 216 in such position after the pin 226 has moved down and away from the cam edge 225.

The upper laterally inner end of the finger 221, and which end is beyond the notched end of plate 216, is then above the lug engaging face of the lug 219, and is in position for engagement by another lug 228 fixed on the adjacent side face of the beam 196. Then, as the platform 179—including the beam 196—descends to a certain level, the lug 228 engages and depresses said upper end of the finger 221. This lifts the finger notch 224 out of holding engagement with the plate 175, and allows the spring 220 to turn the holding plate 216 so that the bottom surface of the notch 218 of the latter flatly engages the lug 219; the back end of said notch limiting the turning of the holding plate 216 by the spring 220. This positioning of the parts is shown in FIG. 21. Then, when the platform 179 and the beam 196 are again raised, the holding plate 216 is free to be pulled by the spring 220 to its initial position, as shown in FIG. 20, where said plate is out of the way of the further full descent of the platform 179 and the beam 196.

Reverting back to the elevator platform 179, said platform comprises, besides the base beam 205, longitudinally extending, transversely spaced box-supporting rails 230 (see FIGS. 1b, 20, 21, and 28–30). The outermost ones of said rails are laterally out from the chains 184, as shown in FIG. 1b, and support upstanding box-end guide strips 231 laterally out therefrom. It will of course be understood that all of the rails 230 are laterally clear of the chains 184, so that the latter are exposed to the bottom of a box resting on said rails.

With this arrangement and structure, a box 181 may be advanced by radial lugs 183 on the feed chains 177 over the rear end of the platform 179 when the latter is fully lowered and the rails 230 thereof are below the upper runs of the chains 184, as shown in FIG. 28. The bottom of the box then becomes engaged by said chains 184 and is conveyed thereby over the platform. When the box reaches a centralized position over the platform it abuts upstanding stops 232 which hold the box against further movement. These stops are slidably mounted on rods 233 which are mounted in connection with the outermost rails 230 parallel thereto, as shown in FIG. 1b. The rods are of sufficient length as to enable the stops to assume positions at both sides of the box alternately. When the platform 179 is lifted with the box to receive a load of melons therein, said box is of course supported by the rails 230 instead of the chains 184, which continue to run as previously stated. Then, when the platform is again fully lowered, after being half-turned as before described and the box is again supported by the chains 184, the stops are then behind the box, and the chains 184 will then advance the box off the platform and deposit said box on a suitably positioned table or receiving conveyor (not shown) beyond the chains 184. When another box is advanced along the feed chains 177 toward the platform 179, said box will first engage the stops 232 and will advance the same along the rods 233 until said stops reach their limit of movement in a forward direction and maintain the box in centered relation on the platform 179.

In order to prevent the feed chains 177 from being driven once a box has been deposited on the platform 179, as shown in FIG. 28, until such platform and the box have been raised and again lowered nearly to the lowest position of the platform for the discharge of the box therefrom, a releasable feed-chain holding device is provided, as shown in FIGS. 28–30.

This device comprises an upstanding arm 235 pivoted at its lower end, as at 236, in connection with a cross member 237 rigid with and extending between the plates 175 and located in a transverse plane adjacent one of the chains 177. The arm 235 on its upper end carries a seat 238 for the outer end of a box-engaging lugs 183 of a feed chain 177 when such lug is at the forward end of the chain and has moved down clear of the box. The arm is yieldably pulled to a lug-engaging position by a spring 239. Projecting from the arm in a forward direction and radially of the pivot thereof is a lug 240. This lug is disposed in a position for engagement from above by a trip finger 241, which is pivoted, as at 242, on a support 243 rigid with and depending from the beam 196 rearwardly thereof. The finger 241 is formed with a depending weight 244 which maintains said finger in a normally horizontal position, while a stop 245 on the support prevents upward swinging of the finger above such horizontal position, while allowing it to freely swing down. Thus, the arm 235 is in a chain-lug engaging position when the platform 179 is in its lowest position and has just received the box thereon; the trip finger 241 being then some distance below said lug, as shown in FIG. 28.

When this occurs, the clutch 191 previously described slips, and the chains 177 will not move. Another box may then be placed on the platforms 182, without danger of such box being advanced ahead of time. When the platform 179 is raised, the trip finger 241 merely snaps upwardly past the lug 240 without affecting the same and said arm 235, as shown in FIG. 29. Then when the platform 179 again descends to its lowest box-discharging position, the finger 241 moves downwardly past and trips the lug 240 and the arm 235 as shown in FIG. 30, and releases the radial lug 183. This allows the chains 184 to resume their driving and box-advancing function.

In operation, the melons are fed indiscriminately from a bin or the like onto the lower end of the conveyors 7 of the unit A. Due to the specific construction of these conveyors, as previously described, the melons as they are conveyed upwardly become disposed with their major axes horizontal and generally transversely. Each melon in each row as it arrives at the upper end of its conveyer engages and actuates the finger 35 of the related counter 33. When such finger has been actuated the number of times for which it has been previously set by the operator (in this case five), the related solenoid 32 is deenergized to cause the arm 27 to engage the disc 25 and thus render the drive to the related conveyor inactive, and halting such conveyor.

When all three conveyors have been thus halted by the passage of the requisite number of melons past the related counter-fingers, the three rows have discharged onto the belt conveyors 37 of the accumulator unit B; movement of the melons along the downwardly sloping conveyors being limited by the engagement of the foremost melons of the rows against the stop plates 80. Initially, such conveyors 37 are driven so that their upper runs move in the direction of the initial conveyors 7. This movement imparts a rotary spinning movement to the melons in opposition to their tendency to roll down the sloping conveyors, and thus positively causes the melons to be oriented so that their major axes extend both horizontally and transversely of the conveyors. Also, this direction of travel of said conveyors 37 prevents the melons from exerting excessive pressure against the stop plates.

As soon as the orientation of the melons has been properly effected, the direction of travel of the conveyors 37 and chains 62 is reversed. This causes the pusher plates 67 to be advanced from their rearmost position, as shown in FIG. 7, into engagement with the rearmost melons of the rows. This advances such rows, pushing the melons past the stop plates 80, which swings about shaft 72 and in so doing releases the latching roller 77. By the time the chain-mounted pusher plates 67 have advanced the rows of melons onto the final assembly belts 86, the supporting cross shaft 66 of said pusher plates has reached and is stopped by the fixed frame-mounted stop lug 82, as indicated in dotted lines in FIG. 8. When this occurs, said shaft has moved under and engaged the tip end of the finger 81; thus preventing said fingers, together with the other elements mounted on the shaft 72, from possibly swinging back ahead of time, when the stop plates 80 are released by the melons, and which would cause said stop plates to get behind instead of ahead of the shaft 66 and pusher plates 67 thereon The melons M, having been thus pushed onto the conveyors 85, are advanced thereby until halted by the engagement of the foremost melons of the rows by the stop pins 92. The melons are then raised from said conveyors 85 by the action of the elevator unit 93 while being turned so that their major axes are vertically disposed, as previously explained, and placed in engagement with the suction cups 133 of the carriage 122.

In the meantime, the direction of travel of the chains 62 is again reversed. This returns the shaft 66 and the pusher plates 67 thereon to their initial positions at the rear end of the conveyors 37, ready for the subsequent melon-pushing operation. This rearward movement of the shaft 66 releases the fingers 81, and the unit of which said finger is a part swings of its own weight so that the finger 73 is in a substantially vertical position, with the latching roller 77 engaged in its peripheral notch 76. By the time said shaft 66 reaches its rearmost position, the stop lug 74 has returned to its holding position immediately behind the depending finger 73. The driving of the chains 62 is then again reversed, since in the meantime other rows of melons have been received on the conveyors 37 and subjected to the axis-orienting rotation, as previously described.

As soon as the melons engage the suction cups 133, as above described and as shown in FIG. 15, the motor unit 142 is activated to cause suction in said cups to hold the melons suspended therefrom, and the presser plates 144 and 160 are advanced to engage the sides of the laterally outermost and endmost melons of the suspended melon-pattern and thus hold all the melons in contacting and compact relationship.

Upon the above operations having been effected, the carriage 122 is advanced to a position overlying the box-supporting and manipulating elevator 180, as indicated in dotted lines in FIG. 4. In the meantime, a box 181 has been fed onto the elevator platform 179, and is then raised to a height such that the bottom of the box substantially contacts the bottom of the melons suspended from the carriage cups, whereupon the suction is relieved, and the melons rest unrestrainedly on the bottom of the box. As the box is lifted, the top edges of its sides and ends engage the bottom flanges of the presser plates 144 and 160 and lift said plates so that they clear the melons; the arms 145 and 161 of the corresponding pairs of plates sliding up on their upper arms 146 and 161, respectively. At the same time, the flaring box locators 149 of the plates 144 engage over the sides of the box to positively locate and maintain the same in proper relationship to the carriage 122 and the pattern of melons supported thereby.

As soon as the pattern of melons has been discharged from the carriage, the latter is returned to its initial position, another pattern of melons is picked up by the carriage in the manner previously described, and said carriage is again advanced to a discharging position over the box supporting elevator platform 179. In the meantime, the box has been lowered somewhat, rotated through 180 degrees for the purpose hereinbefore described, and it is now again raised, but to a somewhat lesser extent than the first time, and the next pattern of melons is allowed to discharge from the carriage into the box. If still another pattern of melons is to be placed in the box, it is again lowered sufficiently for the box to clear the carriage so as to enable the latter to be returned to its initial position to pick up a third pattern of melons, and to be then again advanced to discharge such third pattern into the box. In any case, after the box is fully loaded, the elevator platform 179 on which the box is supported is lowered to its bottom box-carry-off position, as previously described.

The machine as shown and described herein has been designed particularly for use with what are known in the trade as Size 45 and Size 36 melons. With Size 45, five melons are used in each row, for a total of fifteen melons to a pattern. When handling Size 36 melons, however, which are somewhat larger, there are only four melons in each row, or a total of twelve melons to a pattern. For this size melon, the carriage mounted longitudinal beams 125, in which the tubular cup-stems 127 are supported, are removed from the carriage frame and replaced by other similar beams, each having only a four-melon row of stems and suction cups mounted thereon. In this case, the rows of cups are disposed in transversely staggered relation, so that the melon-pattern is similarly staggered. Thus, when the box is being loaded, the turning of the box through 180 degrees after the first melon-pattern has been deposited therein serves to also reverse the staggering of the melon-pattern in the box with the depositing of the second melon-pattern therein, as will be obvious, and results in what is known as a "staggered layer" pack.

In connection with the operation of the machine as above described, it may be stated that it is contemplated that the sequence of operations, from one end of the machine to the other, shall be carried out automatically by control means forming no part of the present invention; the only manual operations then necessary being the replenishment of graded melons at the rear end of the initial feed unit A, and the placing of empty boxes in the box feed conveyor.

It should here be noted and emphasized that while melons are the species of fruit described and shown as being handled by the machine, and are specifically called for in the main in the claims, such terminology is not to be taken as a limitation with regard to the species of fruit which the machine fundamentally is capable of handling. In other words, while the machine herein shown and described has been specifically proportioned to handle melons, particularly those of the cantaloupe type, such machine could—without any changes in function or operation—be proportioned to handle any fruit or other produce having the same general shape-characteristics as melons, but of different dimensions.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A machine for packing melons into a shipping box comprising, in unitary form and sequentially functioning arrangement of parts, a conveyor unit to receive and advance melons in single-layer formation, a box-fitting melon-pattern accumulator onto which said conveyor unit discharges, a melon-pattern support to which the accumulator feeds, a melon-pattern elevator unit associated with the support to receive and lift the melon-pattern, a carriage to receive and support the lifted melon-pattern, and a box supporting and carry-off unit beyond the elevator unit over which the carriage is movable to dispose the lifted and supported melon-pattern in register with the box and into which said melon-pattern is discharged when said box occupies a predetermined position on the related unit.

2. A machine, as in claim 1, in which the conveyor unit includes longitudinal partitions to cause the melons as fed thereon to be separated to form a plurality of single-layer rows, separate melon conveyors between the various partitions, means to separately drive the conveyors, counters mounted on the unit in connection with the different conveyors adjacent the forward ends thereof, each counter including an actuating element positioned for engagement by each melon in turn as such melon reaches the forward end of the conveyor, and means to discontinue the driving of any conveyor upon the related counter having been actuated a predetermined number of times.

3. A machine, as in claim 1, in which the conveyor unit includes longitudinal partitions to cause the melons as fed thereon to be separated to form a plurality of single-layer rows, a motor driven cross shaft on the conveyor unit, separate drive connections between said shaft and the different conveyors each including a normally engaged friction slip clutch, and means to cause any clutch to slip and render the related conveyor inactive upon a predetermined number of melons having been discharged from the forward end of such conveyor.

4. A machine for packing melons into a shipping box comprising, in unitary form and sequentially functioning arrangement of parts, an initial conveyor unit onto which the melons to be packed are fed and arranged to provide a plurality of longitudinal single-layer and transversely spaced rows of melons and having means to cause such melons to be disposed with their major axes in a horizontal plane, means associated with the conveyor unit to enable a predetermined number of melons to be in each row as the latter is discharged from the forward end of the conveyor unit, an accumulator unit on which the melon rows as so discharged are received and arranged to cause the melons to be then disposed with their axes transversely, a melon-pattern assembly and elevating unit onto which the melons are advanced in pattern form from the accumulator unit, the elevator unit including means to lift the melon-pattern a predetermined distance, a box-supporting unit beyond the assembly unit, and a carriage unit having means to engage and support the lifted melon-pattern and arranged to convey the supported melon-pattern to a position over the box for discharge of the melon-pattern thereinto.

5. A machine, as in claim 4, in which the melon-pattern lift means is arranged to move the melons of the rows transversely and into contact with each other as they are being lifted so as to fit transversely into the box.

6. In a machine for packing melons into a shipping box, means to form a single-layer pattern of melons for transfer to such box comprising a conveyor onto the rear end of which melons are fed in succession to form a row, a horizontally yieldable stop associated with the conveyor to engage the foremost melon of the row, means to halt the feeding of the melons when a predetermined number of melons have been so fed, a melon-row support beyond the stop, and means to engage the rearmost melon of the completed row on the conveyor so as to advance the entire row horizontally pass the stop and onto the support; the machine including a unit to engage the pattern of melons onto the support and transfer the same to the box.

7. A structure, as in claim 6, in which the melons are initially disposed on the conveyor with their axes horizontal and the conveyor having a downward slope to its forward end, and controlled means to drive the conveyor in the direction of its rear end before the melons are advanced therefrom whereby to cause the melons to be disposed with their axes transversely of the conveyor as well as being horizontal.

8. A structure, as in claim 6, in which the stop comprises a transverse plate over the conveyor in the path of melons thereon, a cross shaft pivoting the plate at the top on the machine, and latch means yieldably preventing rotation of the plate.

9. A structure, as in claim 6, in which the melon engaging and advancing means comprises an endless flexible member disposed to one side of the conveyor separate therefrom and having an upper run the major portion of which is parallel to the conveyor, a pusher plate supported from the member, and controlled means to reciprocate the member so that said upper run moves through a stroke of predetermined length.

10. A structure, as in claim 6, in which the melon engaging and advancing means comprises an endless flexible member disposed to one side of the conveyor separate therefrom and having an upper run the major portion of which is parallel to the conveyor but the rear end portion of which slopes downwardly, a cross shaft turnably mounted on the member, a pusher plate fixed on and projecting radially upward from the shaft, controlled means to reciprocate the member so that said upper run moves through a stroke of predetermined length forwardly from a point adjacent the rear end of said rear portion so that the pusher plate is then below the level of the conveyor, an arm fixed with and projecting radially from the shaft in a direction forwardly of the member, and means guiding the arm so that said plate remains substantially vertical throughout the stroke of the member.

11. In a machine for packing melons into a shipping box including, with means supporting the box in position to be loaded, means supporting a plurality of melons in a box-fitting single-layer pattern some distance back from the box, a melon-engaging suction cup assembly above the melon supporting means arranged to conform to the melon-pattern, means to lift all the melons simultaneously and into engagement with the suction cups, and a carriage on which the suction cup assembly is mounted movable to convey the supported melon-pattern to a position over the box for the discharge of the melons into the box upon release of the suction; the melons of the pattern being arranged in side-by-side rows extending lengthwise of the direction of movement of the pattern toward the box; the melon supporting means comprising a pair of spaced belts for each row of melons, and the melon lifting means comprising a pair of spaced rods extending lengthwise of and under each row of melons parallel to and between the belts.

12. In a machine for packing melons into a shipping box including, with means supporting the box in position to be loaded, means supporting melons in rows together forming a single-layer pattern some distance back from the box, the melons in each row being in contact with each other but the rows being initially spaced from each other, a suction-cup assembly initially directly over and vertically spaced from the melon-pattern for engagement therewith, the cups of the assembly corresponding in number to the number of melons and conforming generally to the pattern but spaced so that the melons of the different rows as engaged by the cups will be in contact with each other, and means to lift all the melons simultaneously into engagement with the cups and at the same time shift the melons of certain ones of the rows so that all the melons will be in contact with each other and in alinement with the cups when engaging the same; there being means to convey the cup-supported melon-pattern to a position over the box for the discharge of the melons into the box upon release of the suction.

13. A machine, as in claim 12, in which the melon supporting means comprises, for each row of melons, a pair of spaced belts; and the melon lifting means comprises a pair of spaced rods parallel to each other and to the belts and disposed therebetween.

14. In a machine for packing melons into a shipping box including, with means supporting the box in position to be loaded, means supporting a plurality of melons in the form of a box-fitting row and disposed with their major axes horizontal, a row of melon-engaging suction cups above such row, means to lift the melons of the row into engagement with the suction cups and at the same time cause the melons to turn so that said axes will be vertically disposed when the melons engage the cups; there being means supporting the cups for movement of the same from a melon-engaging position to a position over the box for the discharge of the melons thereinto upon release of the suction.

15. A structure, as in claim 14, in which the mounting means for each cup comprises a tubular stem upstanding therefrom and connected at its upper end to a source of suction on the carriage, means on the carriage slidably supporting the stem, and spring means acting on the stem to yieldably resist upward movement thereof.

16. A structure, as in claim 15, with means releasably preventing downward movement of any stem once it has been moved upwardly.

17. A structure, as in claim 14, in which the mounting means for each cup comprises a tubular stem upstanding therefrom and connected at its upper end to a source of suction on the carriage, means on the carriage supporting the stem, and means mounting the cup on the stem for universal rocking movement relative thereto.

18. In a machine for packing melons into a shipping box including, with means supporting the box in position to be loaded, means supporting a plurality of melons in a box-fitting single-layer pattern some distance back from the box and which pattern includes a pair of horizontal rows of melons arranged in spaced parallel relation, corresponding rows of melon-engaging suction cups above the melon rows and arranged closer together than such rows, and means to lift both melon rows simultaneously to a level for suction cup engagement and at the same time move one melon row laterally toward the other row a distance sufficient to compensate for the difference in spacing of the suction cup and melon rows; there being a carriage on which the suction cups are mounted movable to convey the supported melons to a position over the box for the discharge of the melons thereinto.

19. A structure, as in claim 18, in which the melon lift means comprises separate horizontal melon-supporting units extending under the rows, an elevator under said units and including a platform, an arm rigid with one unit and depending to rigid connection with the platform, another arm rigid with the other unit and depending to the platform, means pivoting said other arm on the platform, and cam means acting on the other arm as the platform moves up to swing the other arm toward the first named arm.

20. In a machine for packing melons into a shipping box including, with means supporting the box in position to be loaded, means supporting a plurality of melons in the form of a box-fitting row and disposed with their major axes horizontal and transversely of the row, a row of melon-engaging suction cups above such row, the melon supporting means comprising a pair of belts extending lengthwise under the row in spaced apart relation, melon-row lift means comprising a pair of rods extending lengthwise under the row between the belts, means to raise the rods, and means functioning as the rods are raised to rotate the same so that the melons will be turned sufficiently to dispose their major axes in a vertical plane when said melons reach the cups, there being a carriage on which the cups are mounted movable to convey the cup-supported melons to a position over the box for the discharge of the melons thereinto.

21. A machine, as in claim 20, in which the last named means comprises a bracket at one end of the rods in which said rods are journaled, drive means connecting the rods at said end for rotation in one direction, a normally vertical spindle depending from and journaled in the bracket and gear-connected to one rod, a long-pitch threaded rod connected to and depending from the spindle, and a fixed upstanding sleeve into which the last named rod slidably and turnably projects, said sleeve having an element projecting into the thread-groove of the rod.

22. A structure, as in claim 21, with means to adjust the sleeve vertically relative to the bracket whereby the number of rotations imparted to the threaded row with a predetermined amount of raising of the bracket may be varied.

23. In a machine for packing melons into a shipping box including means to support such box in position to be loaded, a carriage movable from a predetermined station to a position over the box, means on the carriage to engage and support a depending pattern of melons arranged at said station in single-layer form to fit the box, presser plates disposed to normally engage the melons along the sides of the pattern, horizontal flanges along the lower edges of the plates to engage the top edges of the sides of the box, the box when the carriage is over the same being arranged for upward movement to dispose the melons within the box and the flanges then engaging the top edges of such box, and means mounting the presser plates on the carriage for vertical movement so as to move clear of the melons as the latter relatively move down into the box for discharge thereinto; said mounting means comprising telescopic substantially vertical arm units each having an upper and a lower arm, and means mounting the upper arm of each unit on the carriage, the lower arm and the melon supporting means depending from said carriage.

24. In a machine for packing melons into a shipping box including means to support such box in position to be loaded, a carriage movable from a predetermined station to a position over the box, means on the carriage to engage and support a depending pattern of melons arranged at said station in single-layer form to fit the box, presser plates disposed to normally engage the melons along the sides of the pattern, horizontal flanges along the lower edges of the plates to engage the top edges of the sides of the box, the box when the carriage is over the same being arranged for upward movement to dispose the melons within the box and the flanges then engaging the top edges of such box, and means mounting the presser plates on the carriage for vertical movement so as to move clear of the melons as the latter relatively move down into the box for discharge thereinto; said mounting means comprising telescopic substantially vertical arm units each having an upper and a lower arm, means pivotally mounting the upper arm of each unit adjacent its lower end on the carriage, and means applied to the upper arms to swing the same toward or away from each other; the lower arms and the melon supporting means depending from the carriage.

25. In a fruit packing apparatus, a packing and shipping box-locating platform, a box when on said platform receiving the fruit; a horizontal feed conveyor to move a box onto the platform, a constantly driven horizontal carry-off conveyor on which the box is initially supported and advanced as it is moved onto the platform by the feed conveyor, a stop on the platform arranged to engage the forward end of the box and halt the forward movement thereof when said box is fully located on the platform so that the box may then be packed, and means mounting the platform so that it may be lifted to support the box thereon clear of the carry-off conveyor and to then rotate the platform through 180 degrees to dispose the stop at the rear end of the box and platform whereby upon the platform being lowered to its initial position the box will be reengaged by the carry-off conveyor and will be moved thereby clear of the platform.

26. A structure, as in claim 25, with means mounting the stop in connection with the platform for sliding movement lengthwise along the platform whereby when the stop is disposed at the rear end of the platform it will be engaged by the forward end of a box being subsequently fed onto the platform and advanced to adjacent the forward end of the platform.

27. In a fruit packing apparatus, a packing and shipping box-locating platform, a box when on said platform receiving the fruit; a horizontal feed conveyor to move a box onto the platform, means mounting the platform for upward and downward movement between a lowered box receiving position and an upper fruit receiving position, and means between the platform and conveyor preventing the box-advancing movement of the latter upon upward movement of the platform from its initial lowered position and until the platform returns to said initial position; the conveyor comprising an endless member having longitudinally spaced box-engaging lugs projecting therefrom, a holding element disposed in the path of the lugs in position to engage under one of the same upon the latter reaching a position at the forward end of the conveyor and below the bottom of the box, an upstanding arm below and on which the element is mounted, means pivoting the arm at its lower end in a fixed position relative to the platform, a spring acting on the arm to swing the same in a direction to place the element in a lug engaging position, a finger rigid with and projecting from the arm adjacent the pivot and in the opposite direction, a trip to engage the finger, and means mounting the trip in connection with the platform so that upon upward movement of the latter from its lowest position the trip will pass by the finger without moving the same, and upon downward movement of the platform to said lowered position the trip will engage and depress the finger and thereby swing the arm to move the holding element from under the lug.

28. In a machine for packing melons into a shipping box, means supporting a plurality of melons in the form of a box-fitting row and disposed with their major axes horizontal and transversely of the row, a row of melon-engaging suction cups above such row, means to lift the melon row to the suction cups for holding engagement thereby, and means included in part with the melon lift means and functioning as the melon row is lifted to turn the melons sufficiently to dispose their major axes in a vertical plane when they reach the cups.

References Cited by the Examiner
UNITED STATES PATENTS

| | | | |
|---|---|---|---|
| 2,228,451 | 1/41 | Gilfillan | 53—26 |
| 2,291,645 | 8/42 | Nordquist | 53—26 |

(Other references on following page)

UNITED STATES PATENTS

| | | | |
|---|---|---|---|
| 2,296,645 | 9/42 | Marsden | 198—33 |
| 2,665,013 | 1/54 | Socke | 214—1 |
| 2,685,994 | 8/54 | Haumiller et al. | 53—244 |
| 2,855,740 | 10/58 | Noland et al. | 53—250 |
| 2,889,676 | 6/59 | Griffith | 53—244 |
| 2,957,290 | 10/60 | Andreessen | 53—164 X |
| 3,052,071 | 9/62 | Copping | 53—166 X |

FRANK E. BAILEY, *Primary Examiner.*

TRAVIS S. McGEHEE, BERNARD STICKNEY,
*Examiners.*